US006976087B1

(12) United States Patent
Westfall et al.

(10) Patent No.: US 6,976,087 B1
(45) Date of Patent: Dec. 13, 2005

(54) SERVICE PROVISIONING METHODS AND APPARATUS

(75) Inventors: Ronald Leonard Westfall, North Vancouver (CA); Amaranath Sanmugasunderam, New Westminster (CA); Paul Terry, Vancouver (CA); Adam Lorant, Vancouver (CA)

(73) Assignee: Redback Networks Inc., San Jose, CA (US)

( * ) Notice: Subject to any disclaimer, the term of this patent is extended or adjusted under 35 U.S.C. 154(b) by 678 days.

(21) Appl. No.: 09/990,561

(22) Filed: Nov. 21, 2001

Related U.S. Application Data

(60) Provisional application No. 60/252,585, filed on Nov. 24, 2000.

(51) Int. Cl.[7] .................. G06F 15/16; G06F 11/00; G01F 15/16; H04L 12/28
(52) U.S. Cl. .................. 709/238; 709/203; 370/238; 370/351
(58) Field of Search .................. 709/203, 238; 370/238, 351

(56) References Cited

U.S. PATENT DOCUMENTS

| 4,736,363 | A |  | 4/1988 | Aubin et al. |
| 5,159,595 | A |  | 10/1992 | Flanagan et al. |
| 5,933,425 | A | * | 8/1999 | Iwata ........................ 370/351 |
| 6,400,681 | B1 | * | 6/2002 | Bertin et al. ................ 370/218 |
| 6,584,075 | B1 | * | 6/2003 | Gupta et al. ................ 370/256 |
| 6,760,775 | B1 | * | 7/2004 | Anerousis et al. .......... 709/238 |

* cited by examiner

Primary Examiner—John Follansbee
Assistant Examiner—Joshua Joo
(74) Attorney, Agent, or Firm—Blakely, Sokoloff, Taylor & Zafman

(57) ABSTRACT

Network elements at endpoints of a data connection are identified. A network path is generated between the network elements at the endpoints. The network path is validated by determining whether the network path provides at least one service requirement. The service requirement may be a minimum bandwidth requirement, a maximum bandwidth requirement, a maximum delay requirement, a maximum jitter requirement, a reliability requirement, a requirement that the network path includes network elements capable of acting as security gateways that bracket untrusted sections of the network path, a reachability requirement, or a data collection capability requirement. Network elements along a validated network path are configured to implement the service requirement. In one embodiment, the configuration performed on the network elements is recorded.

35 Claims, 12 Drawing Sheets

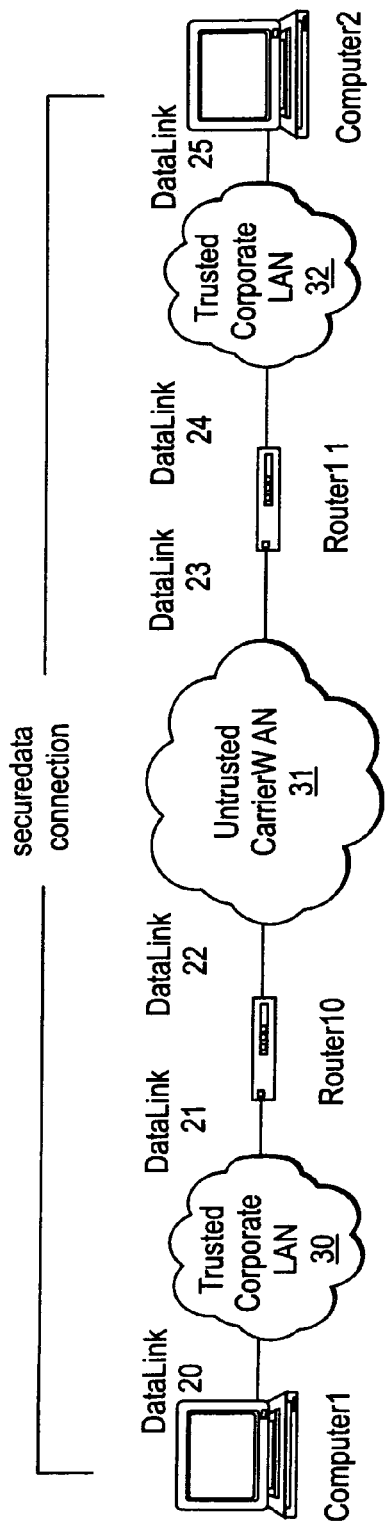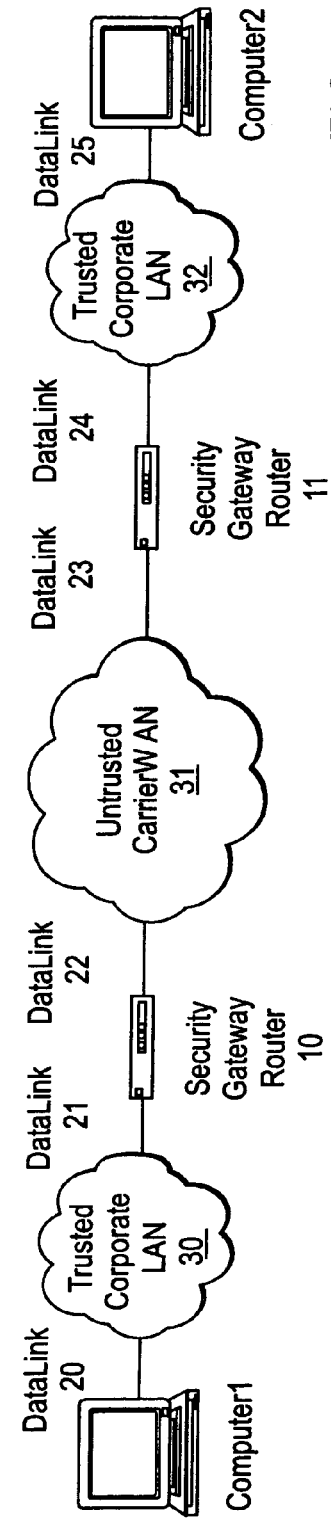

SERVICE PROVISIONING METHODS AND APPARATUS

The present application claims priority to the provisional filed application entitled *Service Provisioning Methods and Apparatus*, filed on Nov. 24, 2000, Ser. No. 60/252,585.

FIELD OF THE INVENTION

This invention relates to the deployment of communication pathways in a packet data network, and more specifically to the provision of connections in a packet data network wherein each connection provides defined levels of Quality of Service ("QoS") and security and wherein devices on the network are configured to collect specified data regarding the connection.

BACKGROUND OF THE INVENTION

Packet data communication networks play a crucial role in today's economy. The Internet is but the most prominent example of a packet data network. In years to come, the conduct of most business will be dependent on packet data communication to some degree.

Packet data communication is used in many contexts. For example, companies are providing remote access to internally developed applications by way of connections on packet data networks. This allows corporate applications to be extended to branch offices, business partners, or other third parties. Packet data communication is also used by companies to access subscriptions to value-added applications provided by Application Service Providers ("ASPs"). ASPs set up applications in a data center and offer remote usage of the applications as a billable service. Some example services offered by ASPs include video-conferencing, computer-aided design, etc.

Whether internally or externally sourced, the use of distributed applications is increasing rapidly. The operators of packet data communication networks ("carriers") want to take advantage of this trend by supplementing their current bandwidth-oriented service offerings with value-added services. The market for providing value-added services is a valuable business opportunity to carriers. Value-added services typically provide higher profit margins than bandwidth-oriented services. Carriers may offer their own services (i.e. they may take on the role of an ASP). They may enter into business arrangements to market services provided by third party ASPs. They may even market services based on applications that were originally developed for internal enterprise use.

Unfortunately existing networks are not by default suited to the delivery of value added services. It is difficult to control the QoS experienced by the user. Networks normally don't restrict access to paying customers. Data is not collected to verify that the necessary QoS was provided or to bill for service usage. Security is implemented manually and separately for each situation requiring valuable data to be protected.

Current packet data networks typically pass packets from a source to a destination by way of a series of nodes. At each node, packets are received and forwarded over data links to other nodes until they reach their destinations. Typically a network device, such as a router, is located at each node. Routers are used to direct packets toward their destinations. Ideally a packet from any source on a network can be forwarded to any destination on the network. Routers typically forward packets using the First In First Out ("FIFO") model (whereby packets are forwarded in the order in which they are received). As a result, packets associated with a time sensitive important business transaction worth millions of dollars may be queued in a router behind packets associated with relatively less important applications such as distributed gaming.

In a public network there can be very large volumes of data packets of relatively low importance. Significant bandwidth within the network can be consumed by low priority web surfing or the like. There is currently no consistent way of providing guaranteed bandwidth and low delay communication for applications such as video and audio conferencing across such a network.

Some routers can be configured to support alternative QoS enhancing forwarding mechanisms in addition to FIFO. Unfortunately there are many varied mechanisms and few standards. Each type of mechanism typically has a unique conceptual basis and requires a correspondingly unique set of parameters to be configured. To configure a router to handle a single service anywhere from zero to twenty or more parameters should be configured.

Some routers can be configured to control access to selected destinations by identifying traffic (packets) from specific users or groups of users. This capability can be used to allow or deny access to specific services. Disallowed traffic is discarded.

Data collection in support of Service Level Agreement ("SLA") measurement is starting to appear, but the collected data is very coarse-grained. The data collected usually summarizes usage by a group of users rather than providing details about the use of a service by any individual user. Using current tools it is difficult to determine whether an individual user, or an instance of an application that a user is using, received an adequate level of service from the network. When detailed data can be collected, it is typically collected for all packets passing through the router. The router usually does not allow data collection to occur selectively for different categories of traffic. The resulting torrent of collected data may even be more voluminous than the packets being measured. Data collection in support of billing for service usage is almost unheard of.

Security technology (for example, IPsec, SSL) is only now becoming widely available. Routers supporting this technology can be configured to authenticate and automatically encrypt packets as they are transported across a network. In the case of IPsec, approximately 15 to 20 parameters should be configured to handle a single service.

It can be appreciated that, while some thought has been directed to how some of the above features might be provided, the technologies available to implement these features are immature and just starting to be deployed. It is impossible to retrofit some of these features into many of the routers already deployed in current networks.

The task of configuring current networks to provide needed features is further complicated because large networks may include many different types of routers, each with its own capabilities and configuration requirements. When a network incorporates routers from multiple vendors, it requires a great degree of skill to configure the diverse mechanisms in a consistent manner to satisfy the requirements of the offered value-added service. Vendors and standards bodies have developed many conceptually diverse technologies. There is little consistency between the approaches used by various vendors.

In some cases, overall requirements may be met by coordinating the configuration of a service across multiple routers whose overlapping feature sets allow all of the requirements to be met when individually no single router in the network is capable of meeting all of the requirements. For example an upstream router may perform traffic shaping to implement QoS whereas a downstream router implements security or access control. Coordinated deployment of a service across multiple routers with incomplete feature sets requires even greater skill.

Packet data networks, such as the Internet, are continually growing. There are many routers to be configured and managed. To satisfy the access control, QoS, security, and data collection requirements of an offered service, many routers are configured separately for each service and often for each subscriber.

A moderate number of parameters are configured in each router to deploy a subscribed service. If an average human performs manual configurations with an accuracy of 95–99%, it will often be the case that there will be at least one error somewhere in the configuration of each configured service. It is extremely difficult for humans to perform this sort of manual configuration consistently and accurately.

There is a need for solutions to these problems if the market for value-added services is to expand.

SUMMARY OF THE INVENTION

A method and apparatus for configuring packet data networks to supply services to users is disclosed. One embodiment automatically deploys services onto a network of routers in order to satisfy the requirements of offered services. A preferred embodiment configures each router to provide appropriate access control, QoS, security, and data collection. Through automation the inaccuracies of manual configuration are avoided.

BRIEF DESCRIPTION OF THE DRAWINGS

In drawings which illustrate non-limiting embodiments of the invention:

FIG. 3 is a schematic diagram of data crossing data networks from a first computer to a second computer wherein the two computers implement a secure end-to-end data connection using IPsec according to one embodiment;

FIG. 4 is a schematic diagram of data crossing data networks from a first computer to a second computer wherein two security gateways implement a secure data connection across the untrusted portion of the network using IPsec according to one embodiment;

DETAILED DESCRIPTION

In order to offer services to the business community, both carriers and ASPs wish to be able to package their services for convenient usage. In a preferred embodiment, it is possible to quickly turn on or turn off access to a service by a particular entity. Additionally, in an embodiment, access to the service is restricted to paying customers.

The network by way of which the services are provided in one embodiment provides QoS, security and data collection services so that the services are performed in a way which meets or exceeds customer expectations. In a preferred embodiment, QoS services are provided so that each user of the service is guaranteed a high quality experience, so that users can justify the money they are expending on the service; so that sufficient network bandwidth is provided to transfer the expected amount of user data in a timely manner; so that highly interactive applications transfer data with low delay and small variations in delay (i.e. jitter); and so that data transfer is reliable to accommodate application protocols that do not have built-in error detection and retransmission, or to avoid high delays due to excessive retransmission.

In a preferred embodiment, security is provided so that if sensitive business information is involved, users have assurances that their information will be kept private; that communicating entities are authenticated to prove their identifies; and that communicated data is authenticated to ensure that it has not been modified in transit.

In a preferred embodiment, data collection is provided to allow the carriers and ASPs to collect detailed usage data so that bills are generated; so that actual bandwidth consumed is measured; so that network delays and jitter are recorded; so that the amount of data communicated or the duration over which it is communicated is measured; and, so that data is collected about individual instances of service usage.

Embodiments of this invention can be applied to many different types of packet data communication network. The following description discusses the application of one embodiment to a network using the Internet Protocol (IP) (e.g. the Internet), but this and other embodiments are not limited to being used in IP networks.

One embodiment has several aspects. One aspect relates to automatically selecting a path to be taken by data packets through a packet data network in such a manner that the routers or other network devices in the path have the capabilities to provide desired levels of QoS, security and/or data collection. Another aspect relates to configuring routers or other network devices on a selected path to provide desired levels of QoS, security and/or data collection in respect of data packets traversing the path. The capabilities of individual routers are taken into consideration. These aspects are in one embodiment practised separately, and in an alternative embodiment, together.

Figure 1:
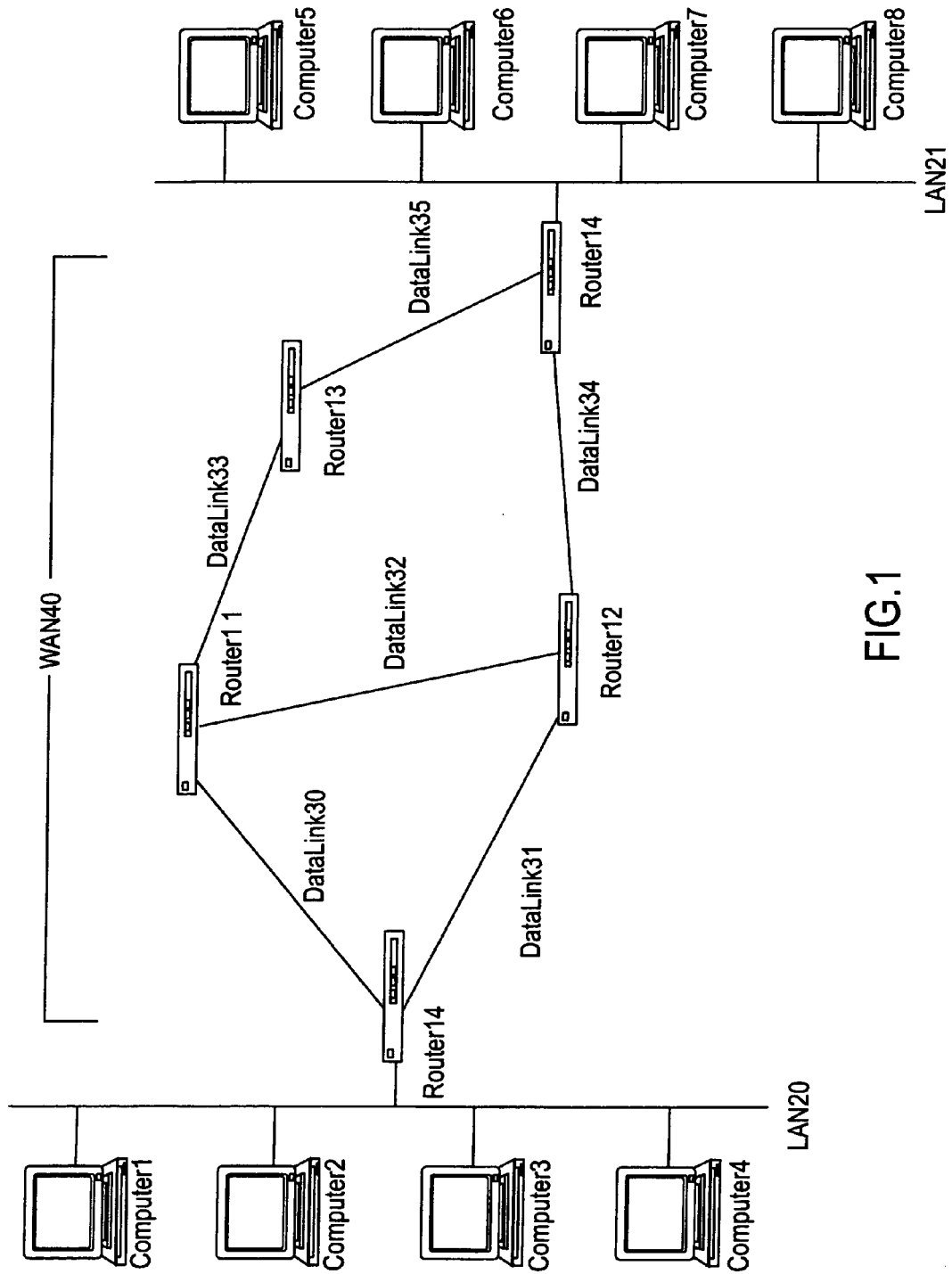
FIG. 1 is a schematic diagram of a simple example wide area network connecting two local area networks according to one embodiment.

FIG. 1 is a schematic diagram of a simple example wide area network connecting two local area networks according to one embodiment. It shows a network which illustrates some of the difficulties addressed by one embodiment. Computers 1, 2, 3, and 4 are inter-connected to each other and router 10 by LAN 20. Similarly, computers 5, 6, 7, and 8 are inter-connected to each other and router 14 by LAN 21. The two LANs and their attached computers are in one embodiment two sites belonging to the same corporation. In the alternative, LAN 20 and its computers in one embodiment belong to a corporation while LAN 21 and its computers in one embodiment belong to an ASP.

WAN 40 comprises routers 11, 12, and 13. WAN 40 also includes data links 30, 31, 32, 33, 34, and 35. Routers 10 and 14 are according to one embodiment considered to belong to LANs 20 and 21, since these are access routers that connect LANs 20 and 21 respectively to WAN 40.

In an IP network comprising routers which are capable only of traditional FIFO routing, the routers are typically configured to forward packets via the shortest path between the source computer and the destination computer. In the example network of FIG. 1, if computer 3 sends packets to computer 6, those packets will likely be forwarded along the shortest path. This path extends from computer 3 to computer 6 by way of: LAN 20, router 10, data link 31, router 12, data link 34, router 14, and LAN 21.

Some modern routers support additional QoS-enhanced forwarding mechanisms. Typically these routers perform FIFO routing by default. QoS-enhanced forwarding is only performed if a user explicitly configures the router to perform QoS-enhanced forwarding. Some types of QoS-enhanced forwarding allow certain packets to be directed out a selected output port of a router. If routers 10, 11, 13, and 14 support QoS-enhanced forwarding mechanisms, it is in one embodiment possible to configure these routers so that packets being sent from computer 3 to computer 6 follow a different path. For example, the packets are in one embodiment sent along a path extending from computer 3 through LAN 20, router 10, data link 30, router 11, data link 33, router 13, data link 35, router 14, LAN 21, and finally to computer 6.

Suppose that the communication between computers 3 and 6 in FIG. 1 is associated with a service based on a point-to-point client/server application. Suppose that computer 6 is the server. It is possible that the computers 1, 2, and 4 in one embodiment are also using the service (i.e. a client/server application) at the same time as computer 3. The packets flowing between the computers on LAN 20 and computer 6 will follow the same path through the network. This is an example of "concurrent service usage" between the computers of LAN 20 and computer 6.

Each router has a number of output ports. Each output port connects to a data link. When a packet is received at a router the router reads the packet's destination, determines the appropriate output port and queues the packet at the selected output port to wait for its turn to be transmitted on the data link attached to the output port. In the case of FIFO routing, the queued packets are transmitted in the order in which they were queued. Each type of QoS-enhanced forwarding mechanism has its own unique scheduling algorithm that determines the order in which queued packets are transmitted.

Quality of Service

Each data link has a bandwidth which in one embodiment is measured in units of bits per second. The bandwidth is in one embodiment fixed, and in an alternative embodiment, it varies. For example, a T3 facility used as a single IP data link in one embodiment provides a fixed bandwidth of approximately 45 Mbps. The same T3 facility is in one embodiment also configured with IP protocol running on top of ATM running on top of the T3. ATM allows the T3 facility to be segregated into multiple virtual circuits. At the IP protocol level, each of the virtual circuits appears to be a separate data link. The bandwidth of a data link running on top of an ATM virtual circuit is in one embodiment fixed, and in an alternative embodiment variable, depending on the ATM virtual circuit's class of service.

The bandwidth of a data link is a resource that is available to be allocated for use by services. For example, in one embodiment it is decided to allocate a 10 Mbps data link to three services. The first service is in one embodiment allocated 5 Mbps, the second service is in one embodiment allocated 2 Mbps, and the third service is in one embodiment allocated 3 Mbps. Once the three services have been allocated these bandwidths, there is no more bandwidth remaining to be allocated to other services. The bandwidth resource has been exhausted.

There are two types of bandwidth on a data link that are in one embodiment allocated to a service. The first type of bandwidth is minimum bandwidth. A service is guaranteed that its minimum bandwidth will be available. For example, by allocating a 1 Mbps minimum bandwidth to a service, the service is guaranteed that there will be at least 1 Mbps of bandwidth available for its use. The second type of bandwidth is maximum bandwidth. A service is not permitted to consume more than its maximum bandwidth. For example, by allocating a 2 Mbps maximum bandwidth to a service, the service will not be permitted to use more than 2 Mbps of bandwidth.

A packet experiences delay as it is forwarded across a network. The packet will experience transmission delays getting out of a router due to the fixed bandwidth of the data link. It will experience signal propagation delays due to the finite speed of signals on a data link. It will experience processing delays in routers when the router first receives it and while the packet is being prepared for transmission once it has been selected as the next packet to be transmitted. It will also experience queuing delays while it is queued in a router waiting to be selected for transmission.

Typically queuing delays are the largest source of delay. If a packet experiences significant delay as it is forwarded across a typical network, most of the delay will be queuing delays. Transmission, propagation, and processing delays typically represent only a small percentage of the overall delay.

Some types of QoS-enhanced forwarding mechanism in one embodiment control queuing delay within a router. By selecting packets associated with a specific service for expedited forwarding, the QoS-enhanced forwarding mechanism in one embodiment ensures that packets associated with the service experience low delays. If this expedited forwarding is performed consistently across the network, the overall delay experienced by packets associated with the service is in one embodiment managed to a selected value even if other packets experience longer delays in traversing the network.

Not all routers are equal. A network in one embodiment includes many different types of routers each having different capabilities. For certain services, it is in one embodiment desirable to control the maximum cross-network delay. Since transmission, propagation, and processing delays are fixed values for a given path through the network, subtracting the various transmission, propagation, and processing delays from the maximum cross-network delay is in one embodiment used to calculate the maximum cross-network queuing delay. In preferred embodiments, portions of the maximum cross-network queuing delay are allocated to each router along the path as a maximum cross-router queuing delay. Where a certain router on the path only loosely controls cross-router queuing delay, that router is in one embodiment allocated a larger portion of the maximum cross-network queuing delay. A router that expedites packets and tightly controls delay is in one embodiment allocated a smaller portion of the maximum cross-network queuing delay.

Figure 2:
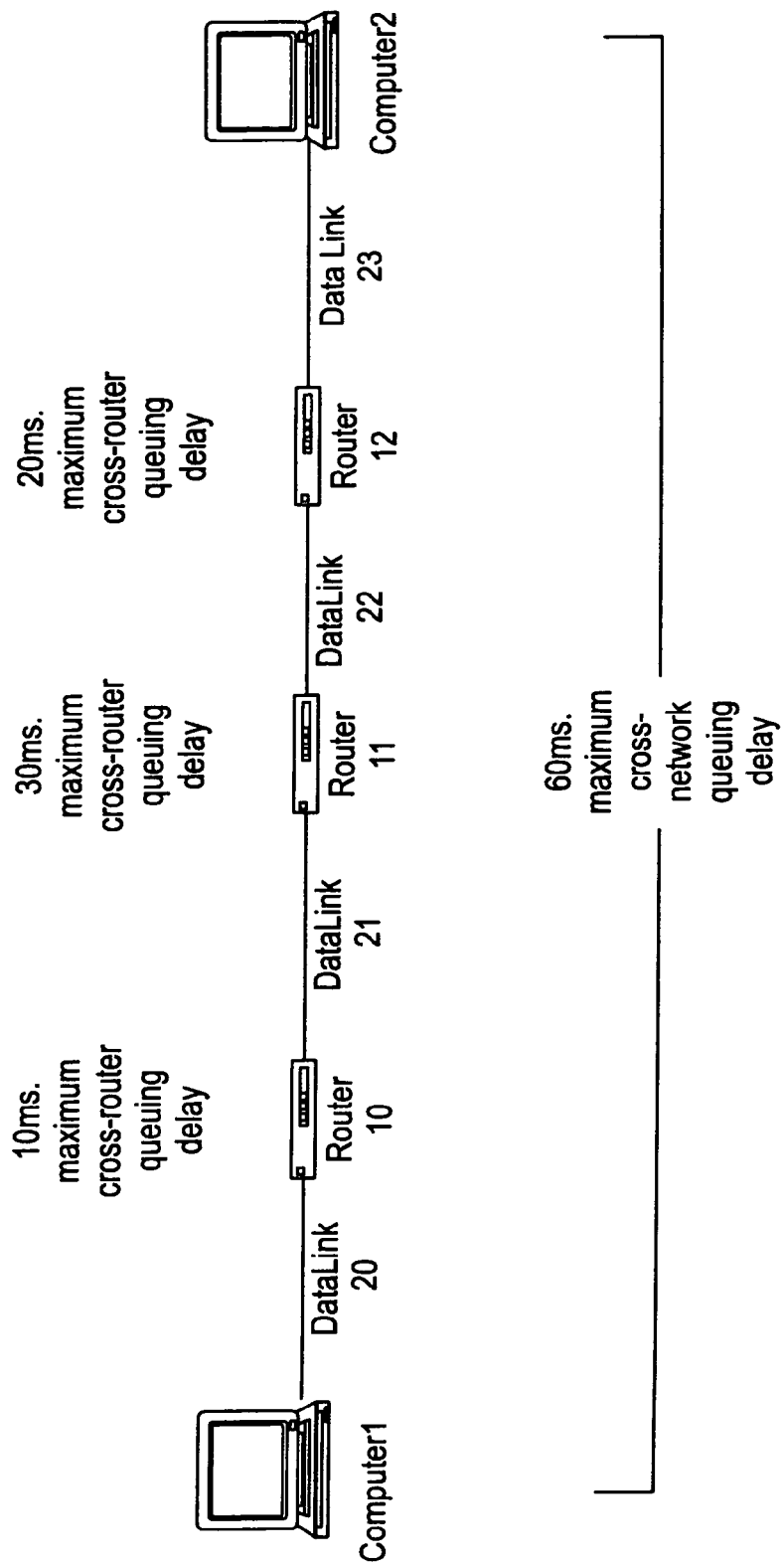
FIG. 2 is a schematic diagram of data crossing a network from a first computer to a second computer illustrating a cross-network queuing delay according to one embodiment.

FIG. 2 is a schematic diagram of data crossing a network from a first computer to a second computer illustrating a cross-network queuing delay according to one embodiment. As an example, consider the network path shown. This path connects computer 1 to computer 2. It includes data link 20, router 10, data link 21, router 11, data link 22, router 12, and data link 23. The maximum allowable cross-network delay is in one embodiment set at 65 ms. Once transmission, propagation, and processing delays have been subtracted, the maximum cross-network queuing delay is in one embodiment found to be 60 ms. In the example shown in FIG. 2, 10 ms. of the 60 ms. has been allocated to router 10 as its maximum cross-router queuing delay. Router 11 has been allocated 30 ms. of the 60 ms. as its maximum cross-router queuing delay. Router 12 has been allocated the remaining 20 ms. of the 60 ms. as its maximum cross-router queuing delay.

It is not possible to control the maximum cross-router queuing delay experienced by packets associated with a service unless some constraints are placed on the service. Consider a situation where a router is only receiving packets associated with one service. If the ingress bandwidth of these packets exceeds the egress bandwidth, the cross-router queuing delay in one embodiment increases with the passage of time. Because of this, maximum cross-router queuing delay in one embodiment is controlled so that it does not exceed a designated level if the service is sufficiently well behaved that the ingress bandwidth does not exceed the designated maximum bandwidth of the service and the guaranteed egress bandwidth equals or exceeds the maximum bandwidth. Since all networks have some bandwidth limitations, a maximum cross-router queuing delay for packets in a service is in one embodiment set if a maximum bandwidth for the service is also set.

Jitter is a measure of the variation in delay. For example, if the packets associated with a service experience cross-network delays ranging between 40 and 60 ms., the packets are experiencing 20 ms. (60 ms.–40 ms.) of jitter.

Some types of QoS-enhanced forwarding mechanism according to one embodiment control jitter. If the forwarding mechanism manages the queuing delay within the router, so that each packet associated with a service experiences the same queuing delay, the jitter will be zero. If jitter management is performed consistently across the network, the overall jitter experienced by the packets associated with a service is in one embodiment managed to a specific value.

For certain services, it is in one embodiment desirable to control the maximum cross-network jitter. Since transmission, propagation, and processing delays are consistent, they introduce only small amounts of jitter. The variation in cross-network queuing delay largely determines the cross-network jitter, so maximum cross-network jitter is in one embodiment considered to be equivalent to the maximum cross-network queuing jitter. Portions of the maximum cross-network queuing jitter are in one embodiment allocated to each router along the path as a maximum cross-router queuing jitter. As with delay, a greater or lesser portion of the maximum cross-network queuing jitter is in one embodiment allocated to individual routers to accommodate their varying abilities to manage jitter.

As a packet is forwarded across the network, it in one embodiment gets lost and does not reach its destination for any of a variety of reasons. A data link or router in one embodiment fails. Routing protocols in one embodiment minimize the number of packets lost due to failures by rerouting packets around the failure if the failure persists. A router in one embodiment has a design flaw that causes packets to be lost. By far the most common cause of packet loss is packet discard associated with congestion. When a router gets congested (i.e. it is receiving more packets than it can transmit), its queues will fill up. At some point the router is forced to discard packets. If the packets associated with a service can be exempted from being discarded in congestion situations, it is possible to control the packet loss rate experienced by a service.

In order to control packet loss, the concept of reliability is in one embodiment introduced. If a service is required to have a reliability of 99% then only 1% of its packets are allowed to be lost. Where only one attempt is made to send a given packet from the source computer to the destination computer, this concept makes sense. When a protocol (e.g. TCP) keeps track of sent packets, returns acknowledgements for successfully received packets, and retransmits lost packets, it is not clear what reliability means, because each packet will probably get through eventually even if it is discarded 1000 times before it is successful.

Excessive retransmission results in a large apparent cross-network delay before the packet is successfully received at the destination computer. Individual routers do not normally manage this large delay, because they do not consider retransmissions when managing cross-router queuing delay. Rather than factoring packet loss into delay management, it makes more sense to control the number of retransmissions.

For protocols that retransmit lost packets, the concept of reliability is in one embodiment extended. If a service is required to have a reliability of 99%, a maximum of 1% of its packets will in one embodiment over require a retransmission because the first copy of the packet was lost.

It is not possible to control packet loss experienced by a service unless some constraints are placed on the service. Consider a situation where a router is only receiving packets associated with one service. If the ingress bandwidth of these packets exceeds the egress bandwidth of the router, the length of the queue of packets in the router awaiting forwarding will keep growing. Eventually the router will have to discard some packets despite the service having a reliability of 99%. Because of this, service reliability is in one embodiment controlled to a designated level if the service is sufficiently well behaved so that the ingress bandwidth does not exceed the designated maximum bandwidth of the service and the guaranteed egress bandwidth equals or exceeds the maximum bandwidth. A service attempting to control reliability in one embodiment also specifies a maximum bandwidth.

Security

A service in one embodiment requires that data communication be secured in transit across an untrusted portion of the network. This is in one embodiment accomplished by creating a secure communication channel through the untrusted part of the network by applying authentication and encryption to data packets. The end points of the secure communication channel are in one embodiment required to authenticate themselves to each other, so both parties in one embodiment are certain they are communicating with a trusted party. A security policy is in one embodiment defined for each service that specifies exactly how authentication and encryption are to be performed. Since the security policy applies to all instances of the service, it in one embodiment does not specify locations in the network where security is in one embodiment applied and removed.

IPsec is a security technology that is in one embodiment used to secure IP protocol data communication. IPsec supports various algorithms (e.g. DES, Triple DES, Blowfish) for encryption of data packets. A variety of algorithms (e.g. MD5, SHA) are supported for authenticating that packets have not been modified in transit. Several schemes (e.g. pre-shared keys, public keys, and certificates) are supported to authenticate the parties who are communicating securely with each other.

Figure 5:
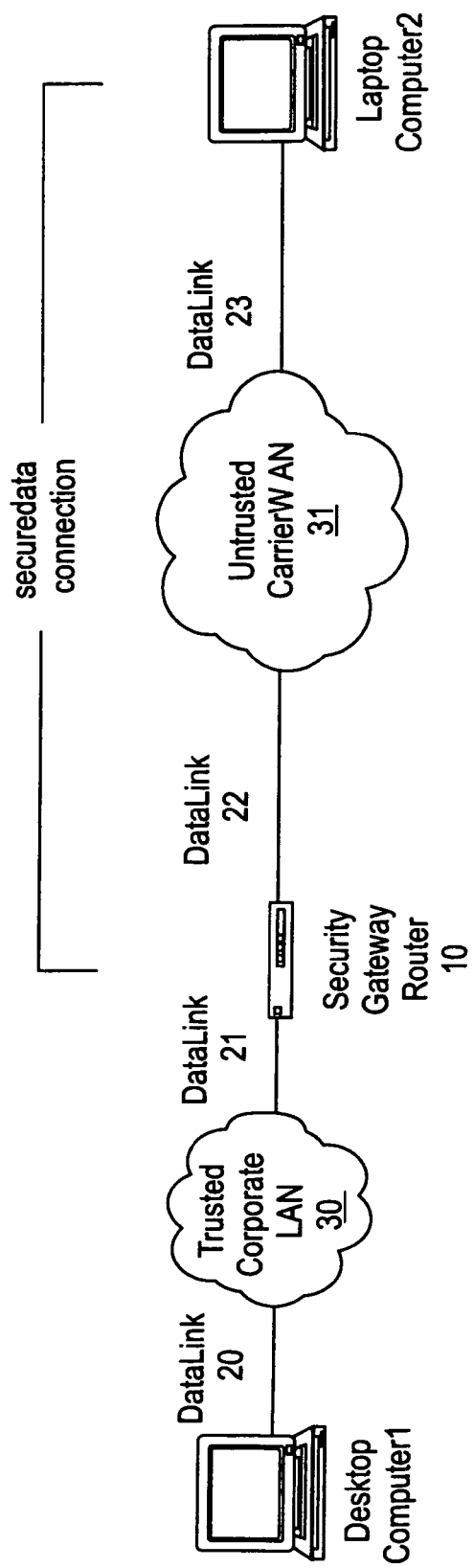
FIG. 5 is a schematic diagram of data crossing data networks from a laptop computer to an office computer wherein the laptop computer and a security gateway implement a secure data connection across the untrusted portion of the network using IPsec according to one embodiment.

IPsec is in alternative embodiments used in a variety of configurations. Two computers in one embodiment use IPsec end-to-end to secure their communication. FIG. 3 is a schematic diagram of data crossing data networks from a first computer to a second computer wherein the two computers implement a secure end-to-end data connection using IPsec according to one embodiment. If the two computers are located on corporate LANs, there is in one embodiment a router acting as a security gateway at the boundary between the trusted LAN and the untrusted WAN. Secure communication is in one embodiment established between two such security gateways. FIG. 4 is a schematic diagram of data crossing data networks from a first computer to a second computer wherein two security gateways implement a secure data connection across the untrusted portion of the network using IPsec according to one embodiment. A telecommuter is one embodiment uses IPsec on their laptop to secure communication between the laptop and the corporate security gateway at the office. FIG. 5 is a schematic diagram of data crossing data networks from a laptop computer to an office computer wherein the laptop computer and a security gateway implement a secure data connection across the untrusted portion of the network using IPsec according to one embodiment.

Other technologies such as Secure Sockets Layer ("SSL") provide in one embodiment similar features for IP protocol based networks. Other security technologies are in one embodiment applied to non-IP networks.

If a service requires secure communication, it is desirable to select a configuration, identify the computers or routers between which secure communication will be implemented, and configure the computers or routers with matching sets of parameters (e.g. algorithm choices, key lifetimes) that control how the security will be provided.

Data Collection

Routers from various vendors support diverse abilities to collect data about the packets that have passed through the router. A first consideration is granularity. Routers in one embodiment collect data about all the packets passing through an input or output interface. Routers in one embodiment collect data about individual categories of packets passing through the interface. Routers in one embodiment collect data about individual packet flows corresponding to individual users and their applications.

A second consideration is the types of data collected. Routers in one embodiment count packets and keep track of time in order to measure actual bandwidth to varying degrees of temporal granularity. Routers in one embodiment measure cross-router delay and jitter or contribute to cross-network delay and jitter measurement. Routers in one embodiment count discarded packets and keep track of time in order to measure reliability. Routers in one embodiment measure service usage. One type of service usage measurement requires the counting of individual packet flows. Another records the source, the destination, the start date and time, and the end date and time of each packet flow.

A third consideration is the degree to which data collection is targeted at individual selected packet flows. Routers in one embodiment support the collection of very detailed data, but collection is in one embodiment performed on all of the packet flows passing through an input or output interface. This in one embodiment results in a torrent of data being collected when only a trickle was desired.

A service in one embodiment requires that an SLA be managed, and in an alternative embodiment, it is billed according to usage. In both embodiments, the above types of data collection are performed. Given the variety of data collection supported by different makes of routers, an appropriate router is selected through which data packets associated with the service will flow and that is capable of performing the required data collection. In a preferred embodiment, this router collects just the desirable data without generating large amounts of uncalled-for data as a by-product.

Service Descriptions

In a preferred embodiment, an initial activity in provisioning a service is to accept as input a detailed description of the service. The description specifies the requirements that are in one embodiment to be satisfied by the provisioning process. The service description in one embodiment, for example, identifies:

the subscriber (i.e. the customer who subscribed to the service);
parties involved in providing or using the service;
the network location of each party;
the maximum amount of concurrent usage of the service between these locations
each data connection that will be instantiated between network locations when the service is in use;
whether data transfer over a data connection is one-way or two-way;
the minimum bandwidth that is to be guaranteed for each data connection (the minimum bandwidth in a data connection in one embodiment is zero);
the maximum bandwidth to which each data connection is constrained (the maximum bandwidth is in one embodiment uncontrolled). The maximum bandwidth is in one embodiment either uncontrolled or greater than or equal to the minimum bandwidth;
the maximum delay that packets in a data connection are allowed to experience (The maximum delay is in one embodiment uncontrolled);
the maximum jitter that a data connection is allowed to experience (The maximum jitter is in one embodiment uncontrolled);
the minimum reliability that each data connection is to be provided (The minimum reliability is in one embodiment uncontrolled);
whether security is to be provided and, if so, a security profile which determines the exact nature of the security to be provided;
the types of data to be collected about packets flowing through the data connection and the granularity at which the data is to be collected.

Since a service may utilize multiple data connections having different requirements, the requirements for each type of data connection are in one embodiment gathered together into a data connection description. A service description is in one embodiment associated with one or more data connection descriptions. Since a security profile specifies how a data connection is to be protected, security profiles are in one embodiment associated with data connection descriptions.

A network location of a party involved in a service provided on an IP network is in one embodiment expressed as an IP address, a set of IP addresses, a range of IP addresses, or an IP subnet. Where the network location of a party is multiple IP addresses, the party in one embodiment uses the service from a computer at any of those addresses. In an alternative embodiment, any one of these locations is expressed as a fully qualified domain name.

A security profile specifies a set of parameters that determine the exact nature of the security to be provided to a data connection. The parameters in one embodiment identify encryption algorithms, authentication algorithms, key lifetimes, how parties are to be authenticated, how public keys are generated, etc. The types of parameters are in one embodiment determined by the security technology being used.

Those skilled in the art will appreciate that there are many equivalent ways of representing service descriptions, data connection descriptions, and security profiles. The information in one embodiment is organized in different groupings than indicated. The information is in one embodiment stored in binary form. In an alternative embodiment, the information is stored in textual form. For example, the information in one embodiment is expressed using the XML language. The information is in one embodiment stored in text files. In an alternative embodiment, the information is stored in binary files. In yet another alternative embodiment, the information is stored in databases.

Data Connections

When a service is used, data connections are established by computer applications associated with each of the parties involved in the instance of the service. The data connections will follow a path consisting of routers and data links through the network between the parties. According to one embodiment, provisioning ensures that the path followed by a data connection passes through routers that are configured to provide the specified QoS, provide the specified security, and perform the specified data collection. Where possible, provisioning will attempt to influence the path taken by data connections to ensure that the path passes through routers with adequate capabilities. Provisioning will configure the routers along the path to meet the specified requirements for the data connection.

The combination of the path followed by a data connection from a source to a destination and the configuration that is performed on routers along this path are in one embodiment referred to as a data connection channel. The data connection channel starts at the router closest to the source and ends at the router closest to the destination. A data connection channel is in one embodiment a uni-directional pipe through the network in which one or more data connections of the same type are carried. Multiple data connections occur when the service is used multiple times concurrently between the same source and destination routers. Two-way data connections will be carried in two data connection channels having opposite directions to each other.

The goal of provisioning is to deploy data connection channels. The endpoints of a data connection channel are specified by the service description. The characteristics of the data connection channel are described by the corresponding data connection description in the service description. Each data connection description describing a one-way data connection will result in one data connection channel being provisioned. Each data connection description describing a two-way data connection will result in two data connection channels being provisioned.

Figure 6:
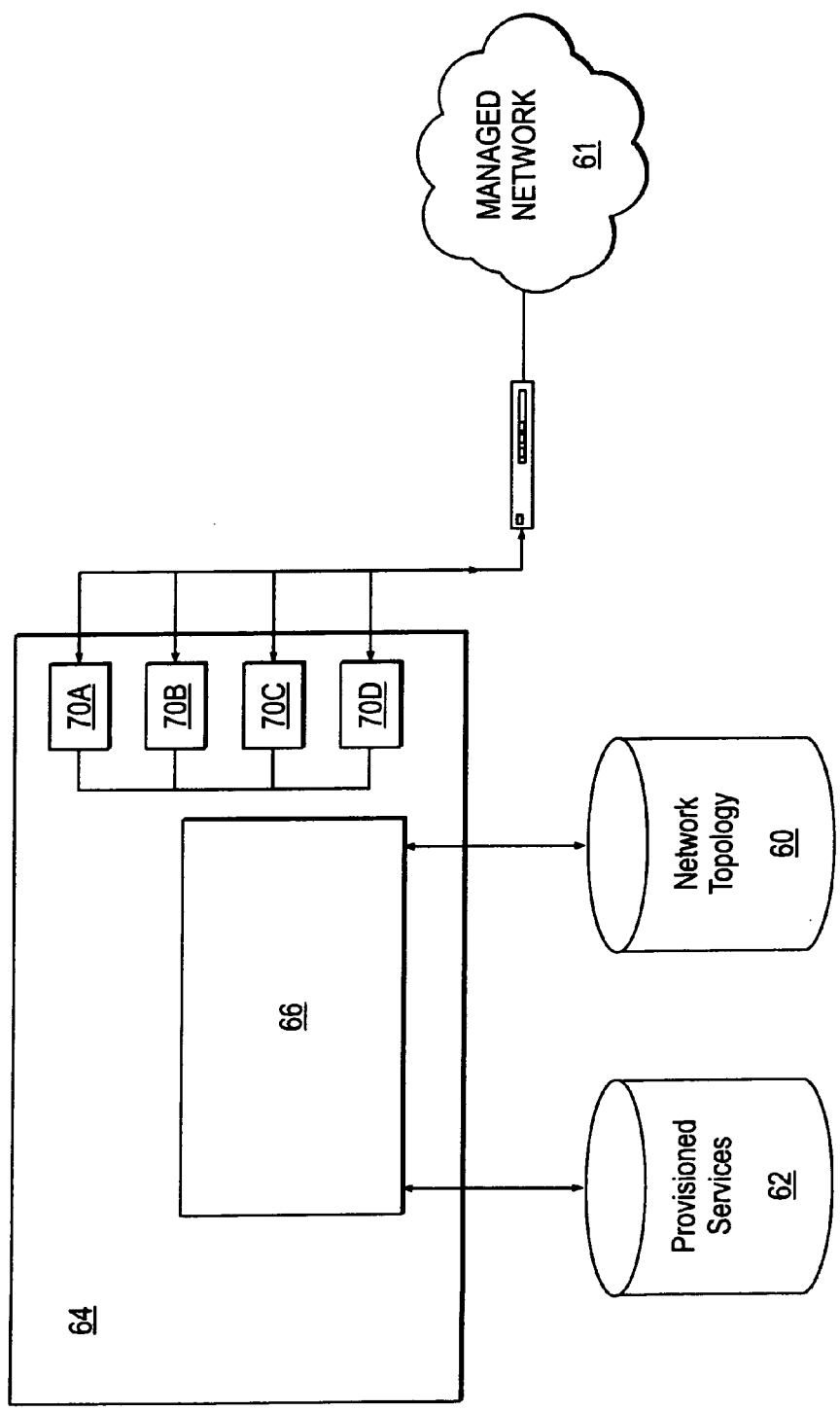
FIG. 6 is a schematic diagram of a possible provisioning system according to one embodiment.

In preferred embodiments, the service description and data connection descriptions are examined by a provisioning system. FIG. 6 is a schematic diagram of a possible provisioning system 64 according to one embodiment. Provisioning system 64 uses the service description and data connection descriptions to identify data connection channels. Provisioning system 64 preferably comprises a programmed provisioning engine 66. In one embodiment, provisioning engine 66 is a network controller computer. Provisioning system 64 performs a separate provisioning activity for each data connection channel. These provisioning activities are in one embodiment performed consecutively or concurrently. If any one of these provisioning activities fails, overall provisioning of the service is considered to have failed, and any data connection channels which belong to the service and have already been successfully provisioned are removed.

In order to identify and possibly influence the path taken by a data connection channel, it is desirable to understand the topology of the network. Preferred embodiments provide a network topology database 60. Network topology database 60 contains information regarding all of the routers in a managed network 61, the interfaces on those routers, and the data links that connect interfaces of different routers together. Network topology database 60 preferably records:

the vendor and model of each router (from the vendor and model, provisioning system 64 in one embodiment looks up the capabilities of the router—such as the types of data that can be collected from each router and the collection granularity—and in one embodiment determines what protocols to use to communicate with the router);

the IP subnet to which each router interface belongs;

the available bandwidth in each direction of each data link;

the status of each data link and the interfaces connected to it;

the type of packet forwarding mechanism used on each interface (e.g. FIFO forwarding, one of the QoS-enhanced forwarding mechanisms);

a copy of the routing table from each router;

a copy of any information from each router that indicates where QoS-enhanced forwarding mechanisms are directing packets;

whom each IP subnet, and hence each router interface, is dedicated to (An IP subnet is in one embodiment either dedicated to a particular customer or to a carrier for public use by all customers); and, whether a router can function as a security gateway (for example, whether the router is an IPsec gateway).

Routing tables are normally associated with FIFO forwarding, but they are also used by some QoS-enhanced forwarding mechanisms. Routing tables are maintained by routing protocols (e.g. Routing Information Protocol ("RIP"), Open Shortest Path First ("OSPF"), Border Gateway Protocol ("BGP"), etc.) that exchange information about network topology between routers. Routing tables normally only consider the destination of the packet in determining where a packet is to be sent. Other QoS-enhanced forwarding mechanisms maintain their own tables that govern where packets are sent. For example, one QoS-enhanced forwarding mechanism uses policies. A policy defines rules that classifies packets into classes on the basis of some combination of source IP address, destination IP address, source TCP/UDP port, destination TCP/UDP port, protocol, type of service, arrival interface, TCP acknowledgement flag, date, and time. The policy specifies where packets that are classified into each class are to be sent.

While network topology database 60 may in one embodiment contain all the information needed to calculate routing tables for routers on network 61, network topology database 60 in a preferred embodiment retrieves and records copies of the routing tables from each of the routers. The reason for this is that various router vendors use slightly different algorithms to generate routing tables which provide the "best" routes to given destinations. Calculations performed from information in network topology database 60 will not necessarily generate routing tables identical to the routing tables in each router. This is especially true in situations where there are multiple alternative equal-length paths to a destination.

Network topology database 60 in one embodiment contains information specifying where the routers will actually send a packet rather than potentially faulty predictions about where the routers will send the packet.

The routers used in networks typically include a management interface which permits the router to be remotely configured and which permits management information (which in one embodiment includes the current configuration of the router, acquired data about traffic through the router, error logs, routing tables, etc.) to be requested and received at a remote location. In a preferred embodiment, network topology database 60 is constructed by remotely querying each router in network 61 for topology information using the management interface. Topology information is acquired when provisioning system 64 is first started and thereafter on a periodic basis to ensure the information in network topology database 60 remains up to date.

Those skilled in the art will appreciate that there are many equivalent ways of representing network topology. In different embodiments, the information is grouped in variety of ways. The data are in one embodiment stored in binary form. The data are in an alternative embodiment stored in text form. The data are in one embodiment stored in text files, in an alternative embodiment in binary files, and in yet another alternative embodiment, in databases.

Preferred embodiments maintain a provisioned services database 62 which contains information describing previously provisioned services. Provisioned service database 62 preferably records:
 the service description, data connection descriptions and security profiles of all previously provisioned services;
 the path taken through the network by each data connection channel; and,
 the configuration that has been performed at each router along the path taken by each data connection channel.

Those skilled in the art will appreciate that there are many equivalent ways of representing previously provisioned services. In different embodiments, the information is grouped in a variety of ways. The data are in one embodiment stored in binary form. The data are in an alternative embodiment stored in text form. The data are in one embodiment stored in text files, in an alternative embodiment in binary files, and in yet another alternative embodiment, in databases.

Network topology database 60 records the available bandwidth on each data link in network 61. Provisioned service database 62 records the minimum bandwidth committed to each data connection channel. By adding together the bandwidth commitments made to data connection channels deployed on a given data link (from provisioned services database 62), provisioning system 64 in one embodiment determines how much, if any, of a data link's bandwidth capacity is still available for allocation to additional services.

Provisioning system 64 uses information in network topology database 60 and the provisioned services database 62 to provision new data connections. Provisioning system 64 in one embodiment allows a percentage of the bandwidth to be reserved separately for each direction of each data link. This reserve is useful because it:
 provides room for manually deployed services;
 provides a buffer to accommodate unanticipated network traffic; and,
 provides a buffer to accommodate imprecisely understood behaviour or imprecise bandwidth control in the router feeding the data link.

The reserved bandwidth is subtracted from the available bandwidth of the data link to determine the effective bandwidth capacity of the data link.

Figure 7A:
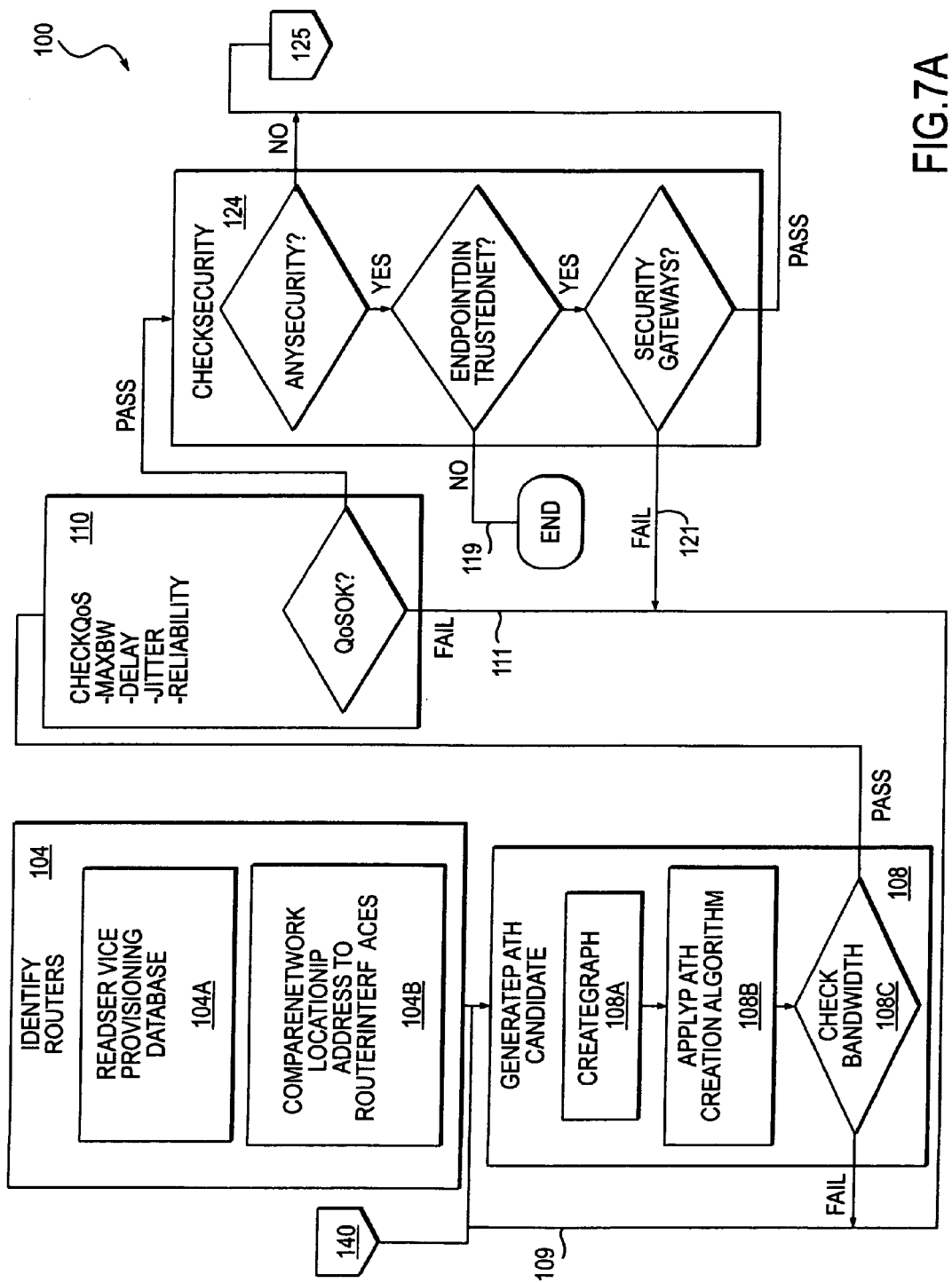
FIGS. 7A and 7B are flow diagrams illustrating a possible method for configuring a network to provide data connections according to one embodiment.
Figure 7B:
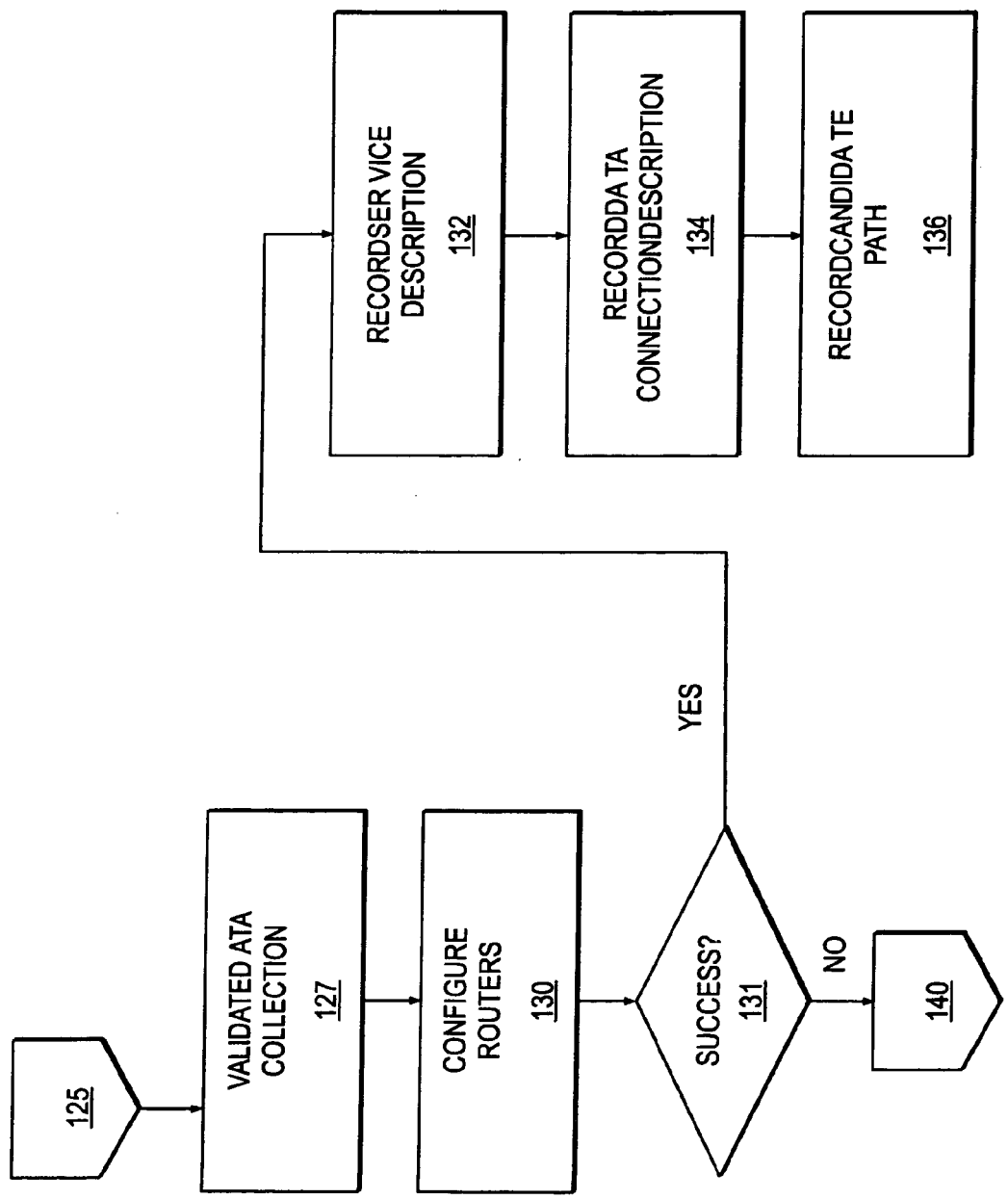

FIGS. 7A and 7B are flow diagrams illustrating a possible method for configuring a network to provide data connections according to one embodiment. FIGS. 7A and 7B depict a method 100 for provisioning a data channel according to one embodiment. Method 100 is typically performed by a provisioning system 64. Method 100 begins by identifying the routers at the source and destination of the data connection channel (process block 104). Process block 104A comprises reading relevant portions of the service description and the relevant data connection description when a service is being initially provisioned or an existing service is being re-provisioned. The provisioning system in one embodiment uses this information to identify the parties at both endpoints of the data connection channel and the network locations of the parties. If necessary, the network locations in one embodiment are translated from a fully qualified domain name to a numeric IP address or IP subnet using a Domain Name Service ("DNS") associated with the network.

For the network location of each data connection channel endpoint, the IP address or IP subnet of the network location is compared to the IP subnet of each router interface in network topology database 60 (process block 104B). If the IP address of the network location belongs to the IP subnet of a router interface, the corresponding router and interface is selected as a possible data connection channel endpoint. If the IP subnet of the network location is identical to the IP subnet of a router interface, the corresponding router and interface is selected as a possible data connection channel endpoint. The result of the comparison will be a set of one or more routers that in one embodiment act as the endpoint of the data connection channel. Process block 104 generates for each of the two endpoints of a data connection channel a set of one or more routers.

Figure 8:
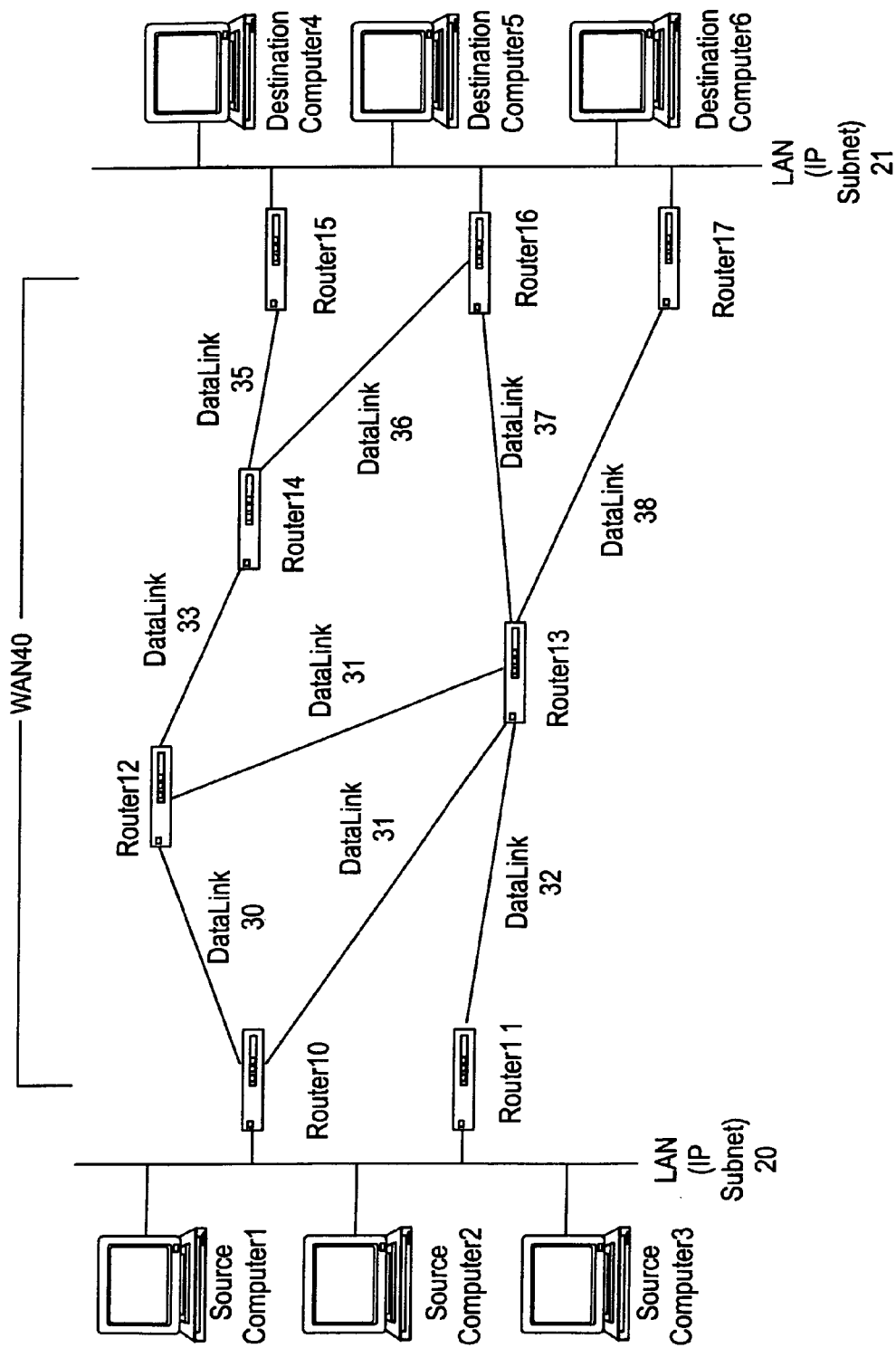
FIG. 8 is a schematic diagram of a simple example wide area network connecting two local area networks according to one embodiment.

FIG. 8 is a schematic diagram of a simple example wide area network connecting two local area networks according to one embodiment. It is an example of source and destination router identification. LAN 20 (i.e. IP subnet 20) is the source of the data connection channel. LAN 21 (i.e. IP subnet 21) is the destination of the data connection channel. Identification of endpoint routers will determine that routers 10 and 11 are connected to IP subnet 20 and are possible endpoints at the source of the data connection channel. It will also be determined that routers 15, 16, and 17 are connected to IP subnet 21 and are possible endpoints at the destination of the data connection channel.

FIG. 8 also illustrates concurrent usage of a service. LAN 20 in one embodiment is resident at a corporate branch office. LAN 21 in one embodiment is resident at a corporate head office. There are in one embodiment multiple users working on source computers 1, 2, and 3 at the branch office that wish to use a corporate application located on destination computer 5. The service description in one embodiment indicates that there can be up to 3 concurrent users of the service. The service description and data connection description in one embodiment indicate a single two-way data connection is required to use the service. As will be seen below, this will lead to the provisioning of two uni-directional data connection channels in opposite directions between either router 10 or 11 at one end and one of routers 15, 16, or 17 at the other end. When the data connection channel is deployed, it is in one embodiment deployed so that the various requirements of the data channel (e.g. bandwidth) are scaled to handle 3 data connections being carried by the data connection channel.

Method 100 continues by generating a path candidate extending between the source and destination endpoint routers (process block 108). For each endpoint where multiple routers were identified as a possible endpoint in process block 104, one of the routers is selected to use as an endpoint for the first attempt to generate an acceptable path candidate. Other ones of the routers are in one embodiment used in subsequent attempts.

The provisioning engine 66 uses information from network topology database 60 to create a graph representing the network (process block 108A). The graph is constructed such that vertices represent routers and links represent data links. Links in the graph have a directionality that indicates a direction in which packets in one embodiment flow on the corresponding data link. Two-way data links are, according to one embodiment, represented in the graph by a bi-directional link or, according to another embodiment, as two back-to-back uni-directional links directed in opposite directions.

Figure 9:
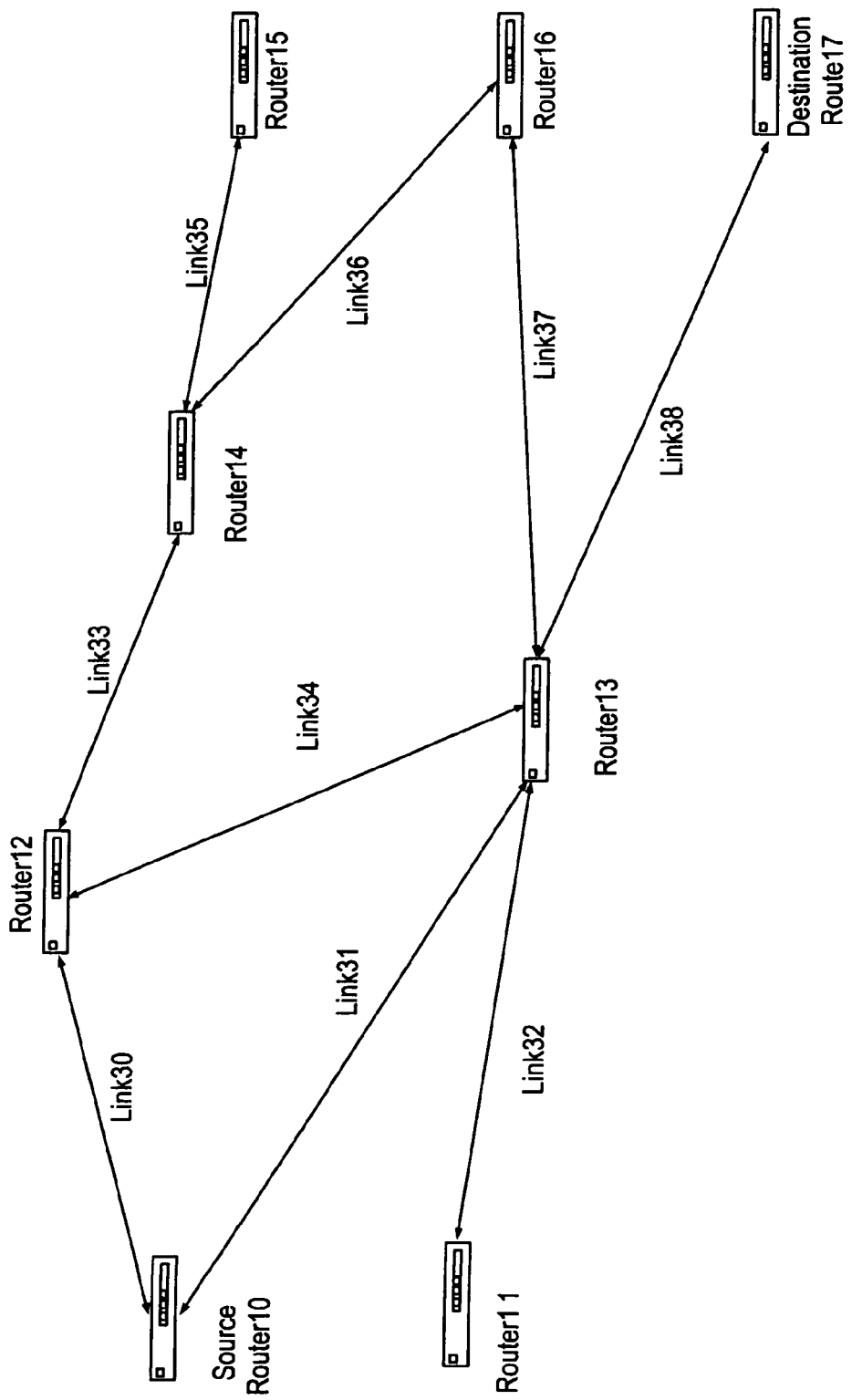
FIG. 9 is a graph diagram representing the network of FIG. 8 according to one embodiment.

FIG. 9 is a graph diagram representing the network of FIG. 8 according to one embodiment. In this graph, router 10 has been selected as the source router and router 17 has been selected as the destination router.

Provisioning engine 66 applies a path identification algorithm to the graph (process block 108B) to identify a path candidate extending from the source router to the destination router. Various path identification algorithms are known to those skilled in the art. A suitable path identification algorithm is in one embodiment capable of identifying a path between two points in a network graph. A suitable algorithm is in one embodiment able to ensure compatibility between the directionality of the data connection channel and the considered links in the graph. Various path identification algorithms are used in various embodiments. For example, there are a number of well-known path identification algorithms (e.g. Dijkstra's Shortest Path First algorithm)("SPF algorithm") that are suitable for path identification in alternative embodiments. Some of the techniques used by such algorithms include graph traversal, heuristics, genetic selection, and stochastic annealing.

In one embodiment, path identification takes into account to the extent possible the QoS, security, and data collection requirements of the data connection channel. Of those requirements only minimum bandwidth should be satisfied by every data link on the path. In alternative embodiments, maximum bandwidth, security, and data collection requirements need only be satisfied at one or possibly two routers along the path, so satisfaction of these requirements are in one embodiment validated after a possible path has been identified. Maximum delay, maximum jitter, and minimum reliability are apportioned to all of the routers along a path, so satisfaction of these requirements is in one embodiment validated after a possible path has been identified.

After a path candidate has been identified, the path candidate is checked (process block 108C) to determine whether the path candidate provides at least the minimum bandwidth required by the service being deployed. For a path candidate to supply the required minimum bandwidth, every data link in the path candidate has in one embodiment an available bandwidth equal to or greater than the minimum bandwidth of the data connection channel. If any data link in the path candidate does not have an available bandwidth greater or equal to the minimum bandwidth then the path candidate is in one embodiment removed from further consideration.

The minimum bandwidth of the data connection channel will be the minimum bandwidth from the data connection description multiplied by the maximum amount of concurrent service usage from the service description.

An implied requirement of a data connection channel is reachability. In other words it is in one embodiment possible to reach the destination router from the source router using every data link along the path. If a router will not allow packets destined for the destination party to be sent out a specific data link, there is no need to consider that data link during path identification.

If a router uses FIFO routing on the interface feeding a data link, or one of the QoS-enhanced forwarding mechanisms that use routing tables, the data link is in one embodiment used to reach the destination party if the routing table indicates that the best route to the destination is via that link. If a router uses on the interface feeding a data link a QoS-enhanced forwarding mechanism that does not use routing tables, the data link is in one embodiment used to reach the destination party if the QoS-enhanced forwarding mechanism can be configured to direct packets to the destination party via that link.

Some path identification algorithms associate weights with links. They use the weights to find the minimum or maximum aggregate weighted path through the graph. Dijkstra's SPF algorithm (see: E. W. Dijkstra, "A Note on Two Problems in Connection with Graphs", Numerische Mathematic, vol. 1, pp. 269–271, 1959) is an example of such an algorithm that finds the minimum aggregate weighted path.

There are two ways that a path identification algorithm in one embodiment takes into account minimum bandwidth and reachability. A first method is to prune the graph while it is being constructed to remove links corresponding to data links that do not satisfy the minimum bandwidth and reachability criteria.

A second method is in one embodiment used with path identification algorithms that use link weighting. The path identification algorithm in one embodiment sets the weight allocated to each link in a manner which takes into account whether or not the link provides the minimum bandwidth and whether or not the link is reachable. This weighting is in one embodiment performed dynamically. The weights are allocated in such a manner that links corresponding to data links that do not satisfy the minimum bandwidth and reachability criteria are not considered.

In one embodiment, Dijkstra's SPF algorithm is used to find the candidate path of minimum aggregate weight between the source and destination routers. Link weights are calculated such that links with inadequate available bandwidth to satisfy the minimum bandwidth criteria are assigned a very large or infinite weight. Links which cannot possibly be used to reach the destination (for example because they are connected to a router which will not direct the data packets in question onto the link), are similarly assigned a very large or infinite weight.

The weighting scheme used by Dijkstra's algorithm (and other algorithms) is a simple integer numerical weight assigned to each link in the graph. Dijkstra's algorithm looks for the lowest aggregate weight. For example, for a path having three links with weights of 3, 7, and 1 the aggregate weight is 11 (i.e. 3+7+1). One embodiment starts with a small weight of, for example, 1 for each link. This weight assumes that the link is suitable for use in reaching the destination. If evaluation concludes the link cannot be used to reach the destination (e.g. no reachability due to routing table entries refusing to direct packets destined for the destination out the corresponding data link), provisioning engine 66 changes the weight of the link to a large number or infinity. If evaluation concludes that there is inadequate available bandwidth on the data link, provisioning engine 66 changes the weight of the link to a large number or infinity. It is noted that infinity is not easily represented as an integer, so in one embodiment a large weight, such as a large integer value, is assigned to links that are unsuitable for use.

In one embodiment, the weights assigned to data links are used to express a preference or strategy for using links in certain parts of a network. For example, candidate paths are in one embodiment preferred which do not pass through the core network. Instead, links passing through a metro network are preferred unless it is absolutely necessary to reach the destination via the core network. In one embodiment, provisioning system 64 is biased against paths which pass through the core network by assigning a higher default weight to all core network data links. The higher the default weight, the stronger is the bias to avoid paths which extend through the core network. Similarly, in one embodiment provisioning system 64 is biased in favour of paths which pass through a core network by assigning a lower default weight to core network data links. In provisioning systems according to a preferred embodiment the default weight to be assigned to links is configurable to allow carriers to implement a deployment strategy.

In preferred embodiments, provisioning system 64 varies the weights assigned to links as a function of the bandwidth that has been previously committed on the links. This permits path identification algorithms to be biased in favor of using links which are under-utilized. This in one embodiment is achieved, for example, by computing a usage fraction by dividing the aggregate bandwidth that has been previously allocated to data connection channels on a data link by the total unreserved bandwidth of the link. Provisioning system 64 in one embodiment reads the total unreserved bandwidth of a link from network topology database 60 and in one embodiment determines how much bandwidth on a link has been previously allocated to provisioned services from information in provisioned services database 62.

For example, a weighting adjustment factor is in one embodiment applied depending upon which of a number of ranges the usage fraction falls into. In one embodiment there are five statuses and associated default percent usage ranges as shown in Table I.

TABLE I

Weight Adjustments

| Usage Fraction (%) | Status | Weight Adjustment |
|---|---|---|
| 0–10 | under-utilized | 0 |
| 11–50 | low normal | 0 |
| 51–75 | high normal | 0 |
| 76–90 | over-utilized | 2 |
| 91–100 | extremely over-utilized | 6 |

Preferably the range of usage fractions in each status category are configurable. A link weight adjustment exists for each usage fraction status category. This link weight adjustment is added to the link weight based on the current percent usage of a data link being considered. Accordingly, data links which are loaded relatively lightly are given preference. The link weight adjustments are preferably configurable. A carrier might use the above strategy to improve the customer's experience with the service by trying to leave uncommitted bandwidth on links as long as possible to handle unforeseen traffic patterns.

In the example of Table 1, links are not penalized until the percent usage hits 75%. A user in one embodiment chooses to more strongly bias the route selection algorithm toward lightly loaded links. This is in one embodiment achieved, for example, by reconfiguring the link weight adjustments as shown in Table II.

TABLE II

Alternative Weight Adjustments

| Usage Fraction (%) | Status | Weight Adjustment |
|---|---|---|
| 0–10 | under-utilized | 0 |
| 11–50 | low normal | 0 |
| 51–75 | high normal | 1 |
| 76–90 | over-utilized | 4 |
| 91–100 | extremely over-utilized | 10 |

In the alternative, higher weights are in one embodiment assigned to lesser utilized links. This in one embodiment will bias the route selection algorithm toward filling existing links before using empty links. A carrier might choose this strategy to defer capital expenditures on new links.

Figure 10:
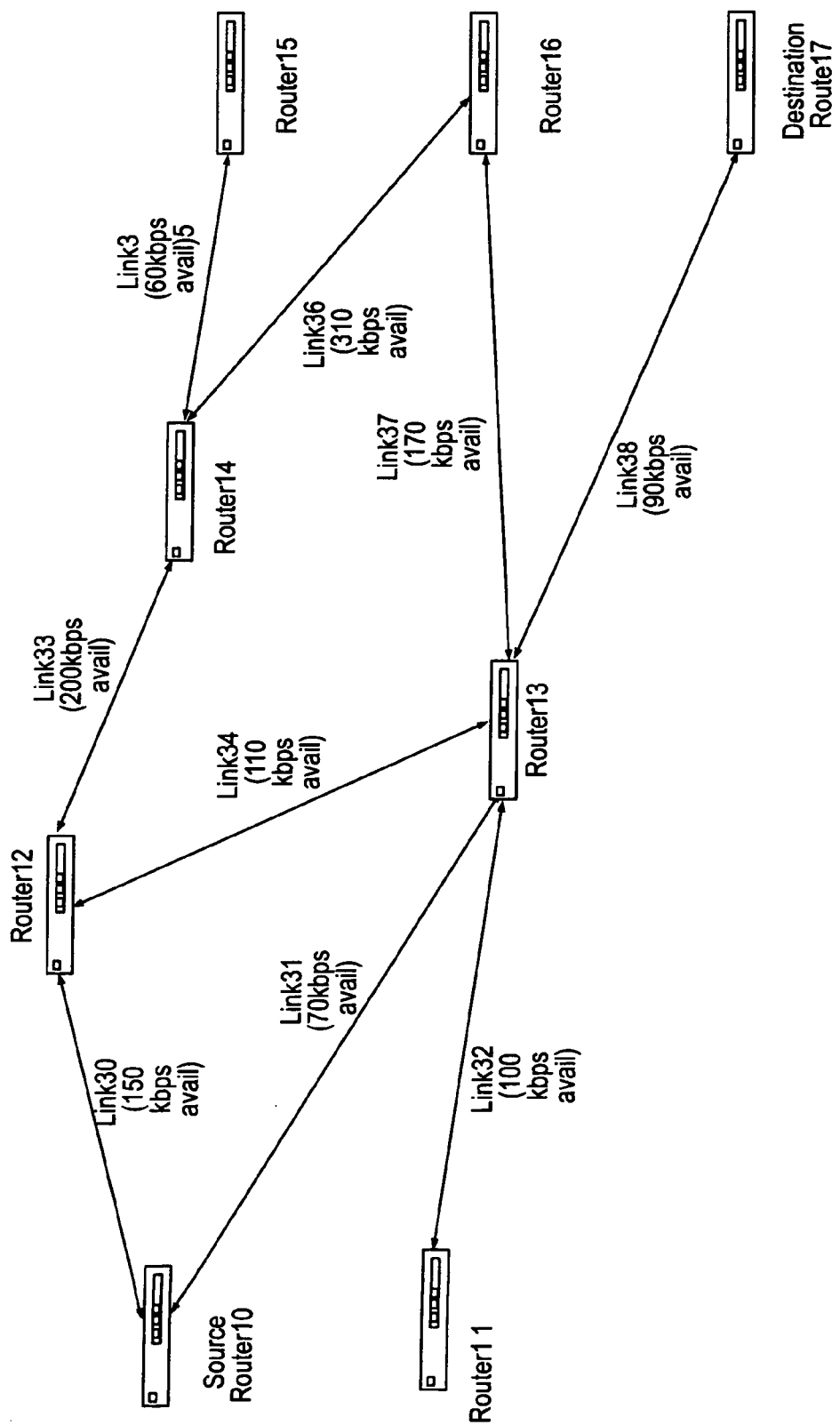
FIG. 10 is the graph diagram of FIG. 9 annotated to include bandwidths for the links in the graph according to one embodiment.

FIG. 10 is the graph diagram of FIG. 9 annotated to include bandwidths for the links in the graph according to one embodiment. Assume the data connection channel being provisioned requires 90 kbps (30 kbps per data connection multiplied by a maximum of 3 concurrent uses of the service). As previously indicated in FIG. 9, router 10 is the source router and router 17 is the destination router. A path is in one embodiment found between these two routers. The path has in one embodiment 90 kbps of available bandwidth. The obvious shortest path is in one embodiment link 31 followed by link 38, but link 31 only has 70 kbps of available bandwidth.

Dijkstra's SPF algorithm will in one embodiment actually find the best path to be that consisting of link 30, link 34, and link 38. A path via routers 14 and 16 will in one embodiment not be selected, because it is longer than the "best" path.

Process block 108 is repeated (as indicated at 109) until a path candidate which is capable of providing the required minimum bandwidth is identified. After a path candidate has been found to be capable of providing the required minimum bandwidth, method 100 continues to validate the candidate path to determine whether it can meet any QoS requirements for the data connection channel (process block 110).

The maximum bandwidth requirement of the data connection channel is the maximum bandwidth from the data connection description multiplied by the maximum amount of concurrent service usage from the service description. The maximum bandwidth requirement of the data connection channel is automatically satisfied if the maximum bandwidth is specified as being "uncontrolled". Otherwise the requirement is in one embodiment satisfied in one of two ways by a candidate path. If there is a data link on the path that has no bandwidth reserved, and whose total bandwidth is less than the maximum bandwidth requirement, then the requirement has been met. Otherwise if there is a router on the path that can be configured to enforce a maximum bandwidth constraint on an individual data connection then the maximum bandwidth constraint is satisfied.

The delay requirements of the data connection channel are automatically satisfied if the maximum delay is specified as being "uncontrolled". Otherwise a delay budget is created. Transmission, propagation, and processing delays are estimated from information in the network topology database and summed over all data links and routers in the candidate path under consideration. It should be noted that the topology database would in one embodiment be required to contain the physical length of each data link in order to accurately calculate the propagation delay. The estimated total transmission, propagation, and processing delays are subtracted from the maximum delay. The remaining delay is the maximum cross-network queuing delay. The maximum cross-network queuing delay is split up and allocated to each router as a maximum cross-router queuing delay.

If a router is using a QoS-enhanced forwarding mechanism on the output interface being used in the candidate path and is capable of managing the maximum cross-router queuing delay of an individual data connection to a numerical limit, the router is in one embodiment assigned the smallest maximum cross-router queuing delay that the router is capable of managing according to the best practices guidelines of the router vendor. Reallocation of the maximum cross-network queuing delay as maximum cross-router queuing delays in the various routers on the path in one embodiment makes all the maximum cross-router queuing delays fit within the maximum cross-network queuing delay.

If a router is not capable of managing cross-router queuing delay to a numerical limit, the maximum cross-router queuing delay requirement is in one embodiment still met by over-provisioning the minimum bandwidth that the router guarantees to the data connection. This technique is in one embodiment used if the data connection description specifies a controlled maximum bandwidth.

The over-provisioned minimum bandwidth is given by equation (1):

$$BW_{min} = max(BW_{max}, (S_{max}/D_{max})) \qquad (1)$$

wherein $BW_{min}$ is the new over-provisioned minimum bandwidth in bits per second, $BW_{max}$ is the required maximum bandwidth from the data connection description in bits per second, $S_{max}$ is the maximum possible size of a packet in bits, and $D_{max}$ is the maximum cross-router queuing delay in seconds. The maximum bandwidth term ensures that the minimum egress bandwidth is at least equal to the maximum ingress bandwidth. The terms $S_{max}/D_{max}$ ensures that enough egress bandwidth is available to get a maximum sized packet out of the router within the required maximum cross-router queuing delay. In an IP protocol network, the maximum packet size is in one embodiment the Maximum Transmission Unit ("MTU") size for the outgoing data link. The MTU is a constant value for any given data link on current IP networks.

The calculated over-provisioned minimum bandwidth is multiplied by the maximum amount of concurrent service usage from the service description and is allocated to the data connection channel as the revised minimum bandwidth of the data connection channel on the specific router being considered. Depending on the bandwidth available on the various routers along the path, the maximum cross-network queuing delay is in one embodiment reallocated as maximum cross-router queuing delays on individual routers, so the calculated over-provisioned minimum bandwidth in each router fits into the available bandwidth on that router.

If a router is not capable of managing the maximum cross-router queuing delay to a numerical limit, or a maximum bandwidth is not specified for the service, or there is insufficient bandwidth available to allocate an over-provisioned bandwidth, or the achievable maximum cross-router queuing delays add up to a total larger than the maximum cross-network queuing delay, the candidate path is considered to have failed validation and is rejected.

The jitter requirements of a data connection channel are automatically satisfied by any candidate path if the maximum jitter is specified as being "uncontrolled". Otherwise a jitter budget is created. The maximum jitter is split up and allocated to each router as a maximum cross-router queuing jitter.

If a router is using a QoS-enhanced forcing mechanism on the output interface and is capable of managing the maximum cross-router queuing jitter of an individual data connection to a numerical limit, the router is in one embodiment assigned the smallest maximum cross-router queuing jitter that the router is capable of managing according to the best practices guidelines of the router vendor. Reallocation of the maximum jitter as maximum cross-router queuing jitters in the various routers on the path in one embodiment makes all the maximum cross-router queuing jitters fit within the maximum jitter.

If a router is not capable of managing the maximum cross-router queuing jitter to a numerical limit, or the achievable maximum cross-router queuing jitters add up to a total larger than the maximum jitter requirement for the data channel, the candidate path is considered to have failed validation and is rejected.

The reliability requirements of the data connection channel are automatically satisfied if the reliability is specified as being "uncontrolled". If the reliability is controlled, reliability requirements in one embodiment are satisfied if all of the following conditions are satisfied. Each router along the path is in one embodiment capable of segregating the traffic associated with the service into a separate queue that is unaffected by other traffic. Each router along the path does not in one embodiment randomly select packets for discard in congestion situations. In other words, each router does not in one embodiment use a packet discard method such as Random Early Discard ("RED") or Weighted RED. Each router along the path has in one embodiment sufficient available bandwidth to over-provision the minimum bandwidth for the data connection channel to be at least equal to the required maximum bandwidth from the data connection description. This ensures that packets associated with the service will not back up in the assigned queue to the point that they are discarded. The minimum bandwidth is in one embodiment further over-provisioned to meet maximum cross-router queuing delay requirements as described above. If any of the above conditions is not met, the candidate path is considered to have failed validation and is rejected.

If any of the QoS requirements cannot be met then the candidate path is rejected as indicated by 111. When a candidate path has been rejected, method 100 selects a new candidate path and attempts to validate the new candidate path as described above. This process is repeated until a candidate path is identified which does meet all QoS requirements specified for the data connection being provisioned.

Making reference to FIG. 7A, according to a preferred embodiment, method 100 continues by validating the candidate path to see if it meets any security requirements for the data connection channel being provisioned (process block 124). If no security is required for the data connection channel, the security requirements are automatically satisfied and method 100 proceeds to process block 125. Otherwise validation proceeds as described below.

If an IP subnet is dedicated to a customer it is in one embodiment assumed to be a subnet that is trusted by the customer. An IP subnet that is dedicated to a carrier is generally assumed to be a public subnet that is untrusted. Security gateways are in one embodiment found to protect any portion of a candidate path which passes through untrusted subnets. A party using a service is in one embodiment assumed to be associated with and belong to the security domain of the customer who subscribed to the service as indicated by the service description. The source and destination parties will probably be connected to the source and destination routers respectively by data links whose IP subnets are dedicated to the subscribing customer. This is in one embodiment determined by examining network topology database 60 of FIG. 6. If so, validation continues as described starting in the next paragraph. If not, the parties are resident on the untrusted network or another customer's trusted network. No path through the network will satisfy the security requirements of the data connection channel. Service provisioning is deemed to have failed and is terminated as indicated at 119 of FIG. 7A.

Starting at the data link connecting the source router to the source party, the provisioning engine 66 follows the candidate path in the forward direction until the data link connecting the destination router to the destination party is reached. Network topology database 60 of FIG. 6 is examined for each router to determine whether the router can act as a security gateway. Network topology database 60 is examined for each data link to see whether the link is dedicated to the subscribing customer (and is therefore "trusted"). For any section of the candidate path where one or more data links are not dedicated to the subscribing customer (i.e. the path is transiting the untrusted public network), method 100 of FIG. 7A attempts to locate a pair of routers capable of acting as security gateways in trusted portions of the candidate path that bracket any untrusted portions of the candidate path.

Figure 11:
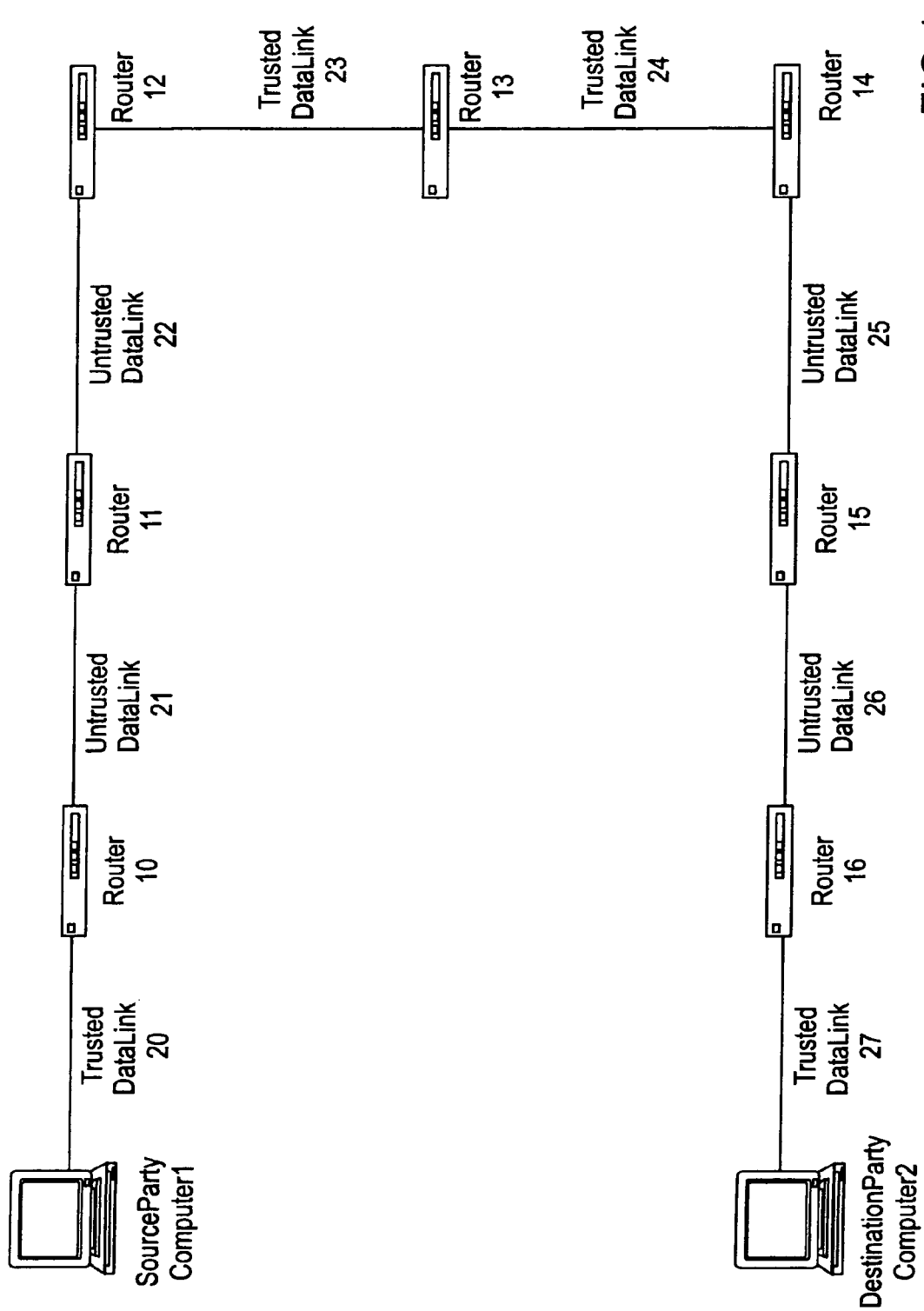
FIG. 11 is a schematic diagram of a candidate path traversing a network according to one embodiment.

FIG. 11 is a schematic diagram of a candidate path traversing a network. The path starts at source party computer 1 and ends at destination party computer 2 according to one embodiment. In between it traverses in order trusted data link 20, router 10, untrusted data link 21, router 11, untrusted data link 22, router 12, trusted data link 23, router 13, trusted data link 24, router 14, untrusted data link 25, router 15, untrusted data link 26, router 16, and trusted data link 27. A pair of security gateways in one embodiment bracket the sub-path consisting of untrusted data links 21 and 22. Routers 10 and 12 are in the correct position to act as security gateways. Similarly routers 14 and 16 are correctly positioned to bracket the sub-path consisting of untrusted data links 25 and 26. Routers 10 and 16 bracket both untrusted sub-paths (together with the trusted sub-path comprising data links 23 and 24). If routers 10 and 16 are capable of acting as security gateways, they in one embodiment protect most of the candidate path.

If pairs of security gateways are in one embodiment found to bracket all untrusted sub-paths in a candidate path then the candidate path is considered to have passed validation and method 100 of FIG. 7A proceeds to process block 125. If no such pairs are found then the candidate path is rejected as indicated at 121. Method 100 then repeats process block 108 to generate another candidate path.

Process block 124 in one embodiment assumes that all security gateways fully implement the same security standard (e.g. IPsec) and are capable of implementing the security described in the security profile associated with the data connection description.

Method 100 continues at process block 127 to validate the candidate path identified for the data connection channel to see if it meets any data collection requirements of the data connection channel. Starting at the source router, the provisioning engine 66 follows the candidate path in the forward direction until the destination router is reached. The provisioning engine checks the record for each router in network topology database 60 of FIG. 6 to determine whether the router can satisfy any of the data connection channel's data collection requirements. If a combination of one or more routers are found along the candidate path which can collectively meet all data collection requirements for the channel then the data collection requirement is considered to have been satisfied. If the destination router is reached and there are any data collection requirements left that have not been satisfied, the path is considered to have failed validation. The path is rejected, and method of 100 of FIG. 7A returns to process block 108 to generate and attempt to validate another candidate path.

A router satisfies a data collection requirement if it collects or can be configured to collect the desired type of information at the desired granularity. If the data collection granularity is at the level of data connections then concurrent service usage is in one embodiment factored into the validation. Concurrent service usage will multiply the number of data connections for which data is in one embodiment collected.

If all the data collection requirements are satisfied, the path is considered to have successfully passed all validation. The path is deemed to be suitable for provisioning the data connection channel.

Method 100 continues at process block 130 by configuring the routers along the successfully validated candidate path to implement the QoS, security, and data collection requirements.

In the previous process blocks, especially the validation process blocks, for each router a record was kept of the minimum bandwidth, maximum bandwidth, maximum cross-router delay, maximum cross-router jitter, and minimum reliability to be enforced at that router. A record was kept of the security functions, if any, to be performed by the router. A record was kept of the data collection, if any, to be performed by the router.

Starting at the source router, the provisioning engine 66 follows the path in the forward direction until the destination router is reached. At each router along the path the provisioning engine attempts to configure the router as to:

enforce the minimum bandwidth, maximum bandwidth, maximum cross-router delay, maximum cross-router jitter, and minimum reliability;

perform the security functions described in the security profile; and, perform data collection, as required.

A preferred embodiment is able to operate in a heterogeneous network consisting of routers from different vendors. Router configuration is vendor dependent. For each vendor and possibly for each model of router, the provisioning engine 66 maintains a translation module 70 (FIG. 6 shows four translation modules 70A, 70B, 70C, 70D). Each translation module 70 is capable of translating minimum bandwidths in bits per second, maximum bandwidths in bits per second, maximum cross-router delays in seconds, maximum cross-router jitter in seconds, and minimum reliability in percent to an appropriate set of management commands for that make and model of router. Provisioning engine 66 identifies the make and model of each router in the path from information in network topology database 60 and selects the translation module 70 appropriate for that router. Provisioning engine 66 then supplies the translation module 70 with the QoS, security and data collection properties which the router in one embodiment is to implement. Translation module 70 translates the desired QoS, security, and data collection properties for that router into a set of commands which in one embodiment are effective to cause the router to implement enforcement of the applicable minimum bandwidth, maximum bandwidth, maximum cross-router delays, maximum cross-router jitter, and minimum reliability. Translation module 70 is capable of translating the security functions described in the security profile to an appropriate set of management commands for that make and model of router to implement the described security. Translation module 70 is capable of translating the data collection allocated to the router to an appropriate set of management commands for that make and model to enable the desired data collection, if necessary.

Each translation module 70 uses the appropriate access protocol (e.g., Telnet, Common Object Request Broker Architecture ("CORBA"), Simple Network Management Protocol ("SNMP"), etc.) to remotely access the router and issue the generated commands to provision the data connection channel. The configuration performed on the router is recorded in provisioned services database 62. The configuration information saved in the provisioned services database 62 is vendor and possibly model specific.

It is not necessary for the capabilities of each router to be recorded in network topology database 60 or in the provisioned services database 62. Preferably the make and model of each router is recorded in network topology database 60. This information is used to identify the translation module 70 corresponding to each router. Each translation module 70 is preferably capable of managing the corresponding router. The translation module 70 translates a standard set of commands and queries into the vendor-specific commands and queries supported by the router. An example of such a standard query is "are you capable of managing minimum bandwidth for a data connection channel?" This might be answered directly by the translation module since it may know the capabilities of each router model supported by the module. Another example of a standard command is "Set the minimum bandwidth to 100 kbps." The translation module would translate this into a vendor-specific command or commands for the supported model of router. Of course, it is not necessary for the standard queries to be expressed in natural language.

Given the diversity of technologies used by vendors, there will be situations where a standard command or query does not translate into a capability of a vendor's router. If the capabilities of the router have been slightly misrepresented, this situation will be detected when the translation module 70 is asked to configure the router. The translation module 70 in one embodiment rejects a configuration request that is incompatible with the router's capabilities. Such a rejection results in the path being rejected (process block 131). When this occurs, method 100 returns to process block 108 (process block 140) to make an attempt to find a different candidate path through the network.

It is noted that it is possible that a given make and model of router will in one embodiment consistently reject the provisioning of services. While possible, this situation is not likely to persist. It implies that the network includes a model of router that is incompatible with one or more of the offered services. If this becomes a problem, the carrier will probably replace the router with a model that is compatible.

An example of such a rejection will in one embodiment occur if a router is a security gateway, but it does not fully implement the IPsec standard. If a translation module 70 is asked to provision security functions (e.g. an encryption algorithm) which the router does not support, it will in one embodiment reject the configuration request.

If a path is rejected during router configuration, any previously completed router configuration will have to be removed. The translation module uses provisioned services database 62 to identify the configuration that has been performed for a data connection channel. Provisioning engine 66 invokes the appropriate translation module(s) 70 to generate and issue management commands to remove the configuration.

Referring to FIG. 7B, if not already done, the service description is recorded in the provisioned services database (process block 132). If not already done, the data connection description and security profile associated with the data connection channel are recorded in the provisioned services database (process block 134). The validated candidate path is recorded in the provisioned services database 62 (process block 136).

Referring to FIG. 6, once a service has been provisioned, a preferred embodiment permits the removal of the provisioned service. To remove a service, provisioning system 64 uses provisioned services database 62 to identify any data connection channels that have been provisioned to implement the service. For each data connection channel, the provisioned services database 62 is used to identify the path followed by the data connection channel and the configuration that has been performed at the routers along the path. Provisioning engine 66 then requests the configuration modules 70 for each router on the path to undo any configuration associated with the data connection channel from each router along the path. The entries in the provisioned services database 62 are then removed. In a preferred embodiment, the configurations of each router are not of a type such that changing a configuration for one provisioned service deleteriously affects the configuration for another provisioned service.

In a preferred embodiment, a service is redeployed after the service description, the data connection descriptions, or the security profiles have been changed. To redeploy a service, provisioning system 64 preferably first removes the service using the entries in the provisioned services database 62 as described above. The service is then provisioned again using the revised service description, data connection descriptions, and security profiles.

Network topology database 60 contains a copy of the routing table from each router. As a result of routing updates exchanged between routers by various routing protocols, the entries in a router's routing table in one embodiment change over time. Routing protocols are designed to be conservative in order to avoid a phenomenon called route flapping where a route in a routing table toggles continuously between two values. Most routers implement algorithms for updating routing tables which provide that a routing table entry will only be updated when a routing protocol is rather certain that the new route will last for a while.

Because routing table changes in one embodiment cause packets associated with a service to be directed out a different interface of a router than predicted from the contents of network topology database 60, in one embodiment, data connection channels passing through a router when a routing table entry has changed are re-evaluated.

The routing tables are reacquired periodically from the router and compared against the old copy stored in network topology database 60 to identify routing table entries which have changed, if any.

A routing table entry identifies a destination IP subnet, an output interface (and hence an output data link), and the next hop router to which a packet destined for the destination IP subnet is in one embodiment forwarded. When a routing table entry changes, the output interface and next hop router in the entry will change. If a router table entry change has been identified, provisioning system 64 in one embodiment uses provisioned services database 62 to identify any data connection channels provisioned on the data link connected to the router interface referenced by the old router table entry. For each identified data connection channel, the provisioned services database 62 is used to identify the destination IP address or IP subnet of the data connection channel. If this IP address or IP subnet belongs to or is a subset of respectively the IP subnet in the changed router table entry, the data connection channel is deemed to be affected by the change in the routing table entry. For each affected data connection channel, provisioned services database 62 is used to de-provision the data connection channel. The data connection channel is then re-provisioned.

Provisioning system 64 will not necessarily be able to control all routers in a network. Some portions of a network are in one embodiment not managed by provisioning system 64 but are managed by some other source. For example, it is unlikely that a corporation would allow a carrier provisioning system to manage their corporate LAN.

The presence of a corporate LAN, customer network or other portion of the network which is not managed by provisioning system 64 in general, is in one embodiment identified via the detection of routers in the network that provisioning system 64 does not have in its topology database 60 or by the detection of IP subnets that are not directly connected to a router in network topology database 60. Routers in the network topology database 60 are considered to be managed routers whereas other routers are considered to be unmanaged routers.

Consider a carrier's router and its one or more interfaces whose data links connect to a customer network. The router's routing table will contain entries for the interfaces connected to the customer network. The routing table will identify next hop routers that are not in network topology database 60. The routing table will also indicate routes via these interfaces to IP subnets that are not directly connected to any managed router. These signs indicate the presence of a customer network.

Additionally, a carrier in one embodiment chooses not to manage (i.e. explicitly provision services to) its core network. The reason for this is that many carriers use extremely fast dumb routers in the core of their networks. These routers in one embodiment only operate in FIFO routing mode, do not act as security gateways, and do not support data collection. They do have enormous capacity however. QoS is not an issue, because the core network data links and routers are upgraded frequently to ensure that they have more capacity than is needed. If a router and its data links have enough capacity to forward all traffic faster than it can accumulate then QoS issues disappear. There are no bandwidth, delay, jitter, or reliability issues.

The presence of an unmanaged core network is detected in exactly the same way as customer networks are detected. Routing tables in managed routers will indicate the presence of routers that do not appear in the topology database and IP subnets that are not directly attached to a managed router.

The term "network cloud" represents an unmanaged customer network or carrier core network. A network cloud according to one embodiment is represented as a new type of node in network topology database 60. If a data link is determined to have unknown routers at the far end of the data link from a managed router then the data link connects the managed router to a network cloud node.

Customer network clouds are in one embodiment distinguished from unmanaged core network clouds by examining the data links connecting a managed router to a network cloud. If the data link is dedicated to a specific customer, the network cloud at the far end of the data link is in one embodiment attributed to that customer. If the data link is dedicated to the carrier, the network cloud at the far end of the data link is in one embodiment an unmanaged core network cloud.

Customer network clouds typically exist at the edge of the managed network and are accessed by one or a few managed routers. Their only significance to service provisioning is that any of the IP addresses or IP subnets in a customer network cloud in one embodiment serve as the endpoint of a data connection. The provisioning method is in one embodiment able to identify a managed router as the endpoint of a data connection channel even when it is not directly connected to a source or destination IP address or IP subnet.

Figure 12:
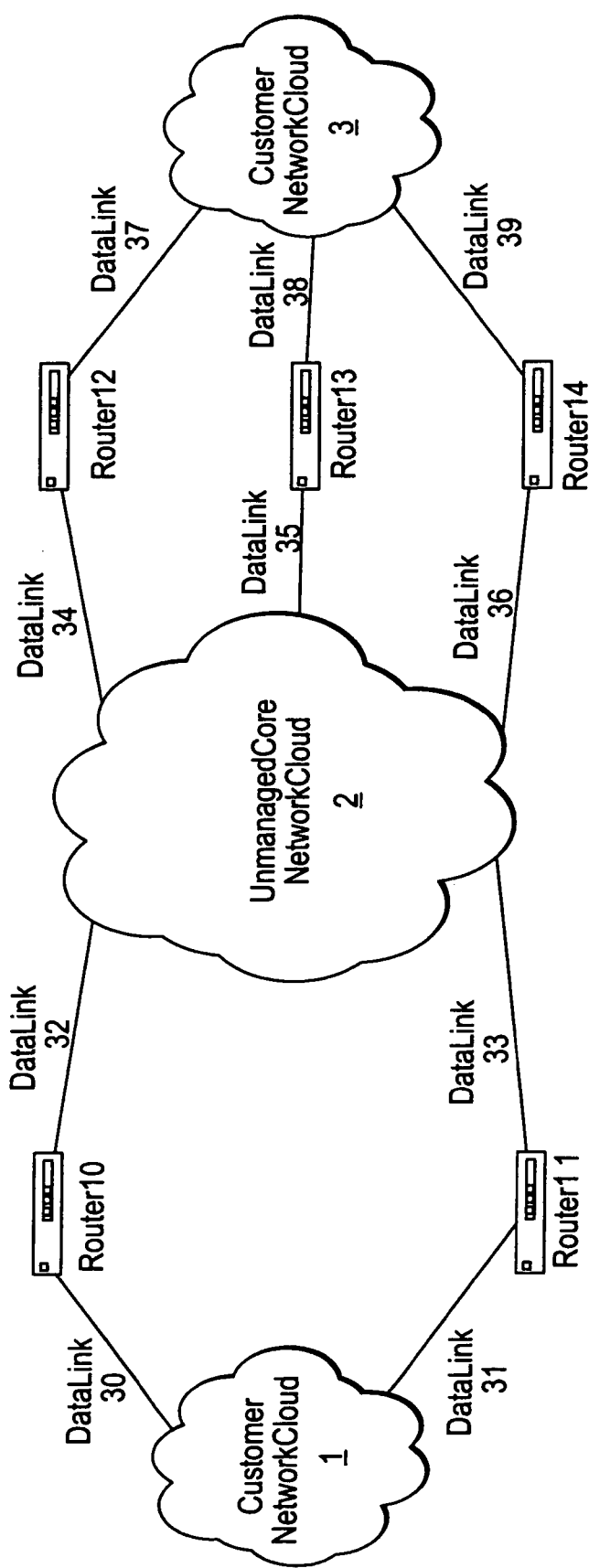
FIG. 12 is a schematic diagram of a possible network topology according to one embodiment.

Unmanaged core network clouds exist at the center of a network. Many services will transit through this cloud. Service provisioning is in one embodiment able to deploy services across such a cloud. FIG. 12 is a schematic diagram of a possible network topology according to one embodiment. The carrier places most of its network in an unmanaged core network cloud. This core network is over-provisioned and provides suitable QoS. Intelligence exists in the access routers. The access routers manage the QoS of low speed access links. The access routers act as security gateways. The access routers support detailed data collection.

Service provisioning is performed across an unmanaged core network cloud by treating it like a single router that has many interfaces and data links connecting it to managed routers. By treating the core network cloud like a router, path identification does not consider the core network cloud's ability to meet the minimum bandwidth requirement.

One potential problem is reachability. In one embodiment, when a data connection enters a core network cloud, it should be determined to where the packets will be routed (i.e. where they will emerge from the cloud). An answer to this problem is to determine experimentally how packets pass through the core network cloud by, for example, using the standard IP protocol utilities ping and traceroute. Ping is in one embodiment used to verify that a router is reachable. Traceroute is in one embodiment used to identify the exact route followed by packets through a network to a specific router. Many routers support ping and traceroute as diagnostic utilities. These utilities are accessible via the management interfaces. Provisioning system 64 in one embodiment invokes these or similar utilities to obtain and store in network topology database 60 information regarding the paths taken by packets through a core network cloud.

In a preferred embodiment, translation modules 70 provide generic access to these capabilities of each managed router in the network. If graph pruning is performed and a link feeding into a core network cloud is kept, the provisioning engine makes a request (preferably via the applicable translation module 70) to the managed router at the source end of the data link to perform a traceroute to the destination of the data connection channel. The traceroute will return a chain of routers that packets will follow to reach the destination. The results of traceroute are analyzed by provisioning system 64 to identify the first managed router on the far side of the unmanaged core network cloud and the data link leading from the core network cloud to that router. The corresponding link is not pruned from the graph. If a data link connecting the core network cloud to a managed router is not a potential path for some router on the far side of the cloud to deliver packets to the destination, the corresponding link is pruned from the graph.

If a path identification algorithm that does link weighting is used, the path identification algorithm according to one embodiment incorporates a traceroute operation at the point when a path being constructed reaches the core network cloud. As soon as the core network cloud is added to the path, the router on the far side of the core network cloud is also added.

During path validation an unmanaged core network cloud is not considered as a possible location to enforce maximum bandwidth. The core network cloud is not considered for allocation of maximum cross-router delay, maximum cross-router jitter, or minimum reliability. Because the core network is over-provisioned, it is assumed to have no delay, no jitter, and perfect reliability. These are not completely accurate assumptions, but they are accurate enough for almost all practical purposes. The core network cloud is assumed to be untrusted and is thus not considered to be a security gateway. The core network cloud is not considered to be capable of performing data collection.

One embodiment is readily extended to many network devices that are not considered to be routers. For example, one embodiment is directly applicable to packet switches, bridges, and hubs that are manageable. One embodiment is also applicable to simple two-port network devices such as dedicated purpose security gateways and firewalls.

A preferred embodiment includes logic hardware configured to perform a method of one embodiment or a computer system programmed to execute a method of one embodiment. One embodiment is also provided in the form of a program product. The program product in one embodiment comprises any medium which carries a set of computer-readable signals corresponding to instructions which, when run on a computer, cause the computer to execute a method of an embodiment. The program product in various embodiments is distributed in any of a wide variety of forms. The program product in one embodiment comprises, for example, physical media such as floppy diskettes, CD ROMs, DVDs, hard disk drives, flash RAM or the like or transmission-type media such as digital or analog communication links.

As will be apparent to those skilled in the art in the light of the foregoing disclosure, many alterations and modifications are possible in the practice of this invention without departing from the spirit or scope thereof.

For example, while the above description contemplates planning a path by starting at a source router, in one embodiment other directions are possible. Starting at a source router is preferable because, if the path fails at some point it is in one embodiment possible to backtrack and salvage a portion of the path without starting all over again to plan a path.

What is claimed is:

1. A method comprising:
    identifying network elements at endpoints of a data connection channel;
    generating a candidate path between the network elements at the endpoints;
    validating the candidate path by determining whether the candidate path provides at least a service requirement based on a service description describing at least one of:
        minimum bandwidth that is to be guaranteed for each data connection,
        maximum bandwidth to which each data connection is constrained,
        maximum delay that packets in a data connection are allowed to tolerate,
        maximum jitter that a data connection is allowed to tolerate,
        minimum reliability that each data connection is to be provided,
        inclusion of network elements capable of acting as security gateways that bracket untrusted sections of the candidate path,
        reachability, and
        data collection capability to be instantiated between network locations when the service is in use, and
    configuring network elements along a validated candidate path to implement the service requirement; and
    identifying a change in a routing table entry;
    identifying data connection channels provisioned on a data link connected to an interface referenced by the routing table entry prior to the change;
    for each data connection channel provisioned on the data link, identifying whether the data connection channel is affected by the change;
    for each data connection affected by the change, de-provisioning the data connection channel affected by the change;
    for each data connection channel affected by the change, re-provisioning the data connection channel affected by the change;
    reserving a predetermined percentage of bandwidth for each direction of a data link, wherein reserving the predetermined percentage of bandwidth is to
        provide room for manually deployed services,
        provide a buffer to accommodate unanticipated network traffic, and
        provide a buffer to accommodate one of an imprecisely understood behavior and an imprecise bandwidth control in a router feeding of a data link; and
    determining an effective bandwidth capacity of the data link by subtracting the reserve bandwidth from an available bandwidth associated with the data link.

2. The method of claim 1, wherein the service description further describes at least one of:
- subscribers who subscribe the service;
- parties involved in providing or using the service;
- network locations of each party;
- a maximum amount of concurrent usage of the service between the network locations;
- each data connection to be instantiated between the network locations when the service is in use;
- whether data transfer over a data connection is one-way or two-way;
- whether security is to be provided and a security profile which determines nature of the security to be provided; and
- types of data to be collected regarding packets flowing through the data connection and granularity at which the data is to be collected.

3. The method of claim 1, further comprising recording a configuration performed on the network elements in a provisioning database, wherein the provisioning database stores information selected from a group consisting of:
- a service description;
- a data connection description for describing one of one-way and two-way data connection channels being provisioned;
- security profiles of all services previously provisioned;
- a path taken through a network by each data connection channel; and
- a configuration that has been performed at each router along the path taken by each data connection channel.

4. The method of claim 3, wherein the configuration of the network elements are performed further based on network topologies of the network provided via a network topology database, wherein the network topology database stores information selected from a group consisting of:
- a vendor and model of each router that determines what protocols to use to communicate with the router;
- a IP subnet to which each router interface belongs;
- a available bandwidth in each direction of each data link;
- a status of each data link and the interfaces connected;
- a type of packet forwarding mechanism used on each interface;
- a copy of the routing table from each router;
- a copy of any information from each router that indicates which QoS-enhanced forwarding mechanisms are directing packets;
- to whom each IP subnet, and hence each router interface, is dedicated to; and
- whether a router can function as a security gateway.

5. The method of claim 1, wherein generating a candidate path between the network elements at the endpoints further comprises:
- assigning to a link in a graph representing the network that is not in a preferred area of a network a weight that is different than a weight assigned to a link in the graph that is in a preferred area of the network; and
- adjusting a weight assigned to a link in the graph depending on a proportion of usage of available bandwidth of the link, wherein a link in the graph having heavier usage relative to other links in the graph is adjusted to a weight indicating a less preference, and wherein a link in the graph is adjusted to a weight indicating a lesser preference, and wherein a link in the graph having lighter usage relative to other links in the graph is adjusted to a weight indicating a greater preference.

6. The method of claim 5, further comprising displaying the graph in a display, wherein vertices represent routers and links represent data links, wherein links in the graph have a directionality indicating a direction in which packets in one embodiment flow on the corresponding data link, and wherein two-way data links are represented in the graph by one of a bi-directional link and two back-to-back uni-directional links directed in opposite directions.

7. The method of claim 5, further comprising determining the minimum bandwidth of the candidate path that is required by the service being deployed,
- wherein each data link in the candidate path includes an available bandwidth equal or greater than the minimum bandwidth of the corresponding data connection channel,
- wherein if any data link in the candidate path does not have an available bandwidth equal or greater than the minimum bandwidth of the corresponding data connection channel, the corresponding available bandwidth equal or greater than the minimum bandwidth of the corresponding data connection channel is removed from the graph for further consideration,
- wherein the minimum bandwidth of the data connection channel is determined based on a product of the minimum bandwidth described in a corresponding data connection description and the maximum amount of concurrent service usage from the service description, and
- wherein the maximum bandwidth of the data connection channel is determined based on a product of the maximum bandwidth from the corresponding data connection description and the maximum amount of concurrent service usage from the service description.

8. The method of claim 7, wherein if a router is not capable of managing cross-router queuing delay, the minimum bandwidth is determined based on the following:

$$BW_{min} = max(BW_{max}, (S_{max}/D_{max})),$$

wherein $BW_{min}$ represents a minimum bandwidth in bits per second, wherein $BW_{max}$ represents a required maximum bandwidth from the data connection description in bits per second, wherein $S_{max}$ represents a maximum size of a packet in bits, and wherein $D_{max}$ represents a maximum cross router queuing delay in seconds.

9. A method for a provisioning system comprising:
- identifying a candidate path for a newly requested service, the newly requested service having a service description, wherein the newly requested service is in an Internet Protocol (IP) network, the IP network having a plurality of routers, wherein the identified candidate path travels through a set of the plurality of routers;
- determining whether the set of the plurality of routers can be configured to meet a set of requirements specified by the service description,
- generating a graph representing the network, wherein vertices represent routers and links represent data links,
- wherein each data link in the candidate path includes an available bandwidth equal or greater than the minimum bandwidth of a corresponding data connection channel,
- wherein if any data link in the candidate path does not have an available bandwidth equal or greater than the minimum bandwidth of the corresponding data connection channel, the corresponding available bandwidth equal or greater than the minimum bandwidth of the corresponding data connection channel is removed from the graph representing the network for further consideration,
- wherein the minimum bandwidth of the corresponding data connection channel is determined based on a product of the minimum bandwidth described in a corresponding data connection description and the maximum amount of concurrent service usage from the service description, and wherein the maximum bandwidth of the corresponding data communication channel is determined based on a product of the maximum bandwidth from the corresponding data connection description and the maximum amount of concurrent service usage from the service description; and if the set of plurality of routers are determined to meet the set of requirements, then translating the set of requirements into a corresponding set of router management commands to configure each router in the set of the plurality of routers.

10. The method of claim 9, wherein the service description comprises:
a minimum bandwidth that is to be guaranteed for each data connection,
a maximum bandwidth to which each data connection is constrained,
a maximum delay that packets in a data connection are allowed to tolerate,
a maximum jitter that a data connection is allowed to tolerate,
minimum reliability that each data connection is to be provided,
an inclusion of network elements capable of acting as security gateways that bracket untrusted sections of the candidate path,
reachability,
a data collection capability to be instantiated between network locations when the service is in use,
subscribers who subscribe the service,
parties involved in providing or using the service,
network locations of each party,
a maximum amount of concurrent usage of the service between the network locations,
each data connection to be instantiated between the network locations when the service is in use,
whether data transfer over a data connection is one-way or two-way,
whether security is to be provided and a security profile which determines nature of the security to be provided, and
types of data to be collected regarding packets flowing through the data connection and granularity at which the data is to be collected.

11. The method of claim 9, further comprising:
reserving a predetermined percentage of bandwidth for each direction of a data link, wherein reserving the predetermined percentage of bandwidth is to
provide room for manually deployed services,
provide a buffer to accommodate unanticipated network traffic, and
provide a buffer to accommodate one of an imprecisely understood behaviour and an imprecise bandwidth control in a router feeding of a data link; and
determining an effective bandwidth capacity of the data link by subtracting the reserved bandwidth from an available bandwidth associated with the data link.

12. The method of claim 9, further comprising:
assigning to a link in a graph that is not in a preferred area of a network a weight that is different than a weight assigned to a link in the graph that is in a preferred area of the network;

adjusting a weight assigned to a link in the graph depending on a proportion of usage of available bandwidth of the link, wherein a link in the graph having heavier usage relative to other links in the graph is adjusted to a weight indicating a lesser preference, and wherein a link in the graph having lighter usage relative to other links in the graph is adjusted to a weight indicating a greater preference; and displaying the graph in a display, wherein vertices represent routers and links represent data links, wherein links in the graph have a directionality indicating a direction in which packets in one embodiment flow on the corresponding data link, and wherein two-way data links are represented in the graph by one of a bi-directional link and two back-to-back uni-directional links directed in opposite directions.

13. The method of claim 9, wherein if a router is not capable of managing cross-router queuing delay, the minimum bandwidth is determined based on the following:

$$BW_{min} = max(BW_{max}, (S_{max}/D_{max})),$$

wherein $BW_{min}$ represents a minimum bandwidth in bits per second, wherein $BW_{max}$ represents a required maximum bandwidth from the data connection description in bits per second, wherein $S_{max}$ represents a maximum size of a packet in bits, and wherein $D_{max}$ represents a maximum cross router queuing delay in seconds.

14. A method for a provisioning system comprising:
identifying a set of one or more candidate paths for a newly requested service in an Internet Protocol (IP) network having a plurality of routers, wherein each of the candidate paths travels through a different subset of the plurality of routers, the newly requested service having a service description;
eliminating a candidate path from the set of candidate paths whose corresponding subset of the plurality of routers cannot be configured to meet the set of requirements specified by the service description including a minimum bandwidth required by the service being deployed, wherein the minimum bandwidth is determined based on $BW_{min} = max(BW_{max}, (S_{max}/D_{max}))$, wherein $BW_{min}$ represents a minimum bandwidth in bits per second, wherein $BW_{max}$ represents a required maximum bandwidth from the data connection description in bits per second, wherein $S_{max}$ represents a maximum size of a packet in bits, and wherein $D_{max}$ represents a maximum cross router queuing delay in seconds; and
translating a remaining candidate path into a set of router management commands to configure the subset of the plurality of routers.

15. The method of claim 14, further comprising:
reserving a predetermined percentage of bandwidth for each direction of a data link, wherein reserving the predetermined percentage of bandwidth is to
provide room for manually deployed services,
provide a buffer to accommodate unanticipated network traffic, and
provide a buffer to accommodate one of an imprecisely understood behaviour and an imprecise bandwidth control in a router feeding of a data link; and
determining an effective bandwidth capacity of the data link by subtracting the reserved bandwidth from an available bandwidth associated with the data link.

16. The method of claim 14, further comprising:
assigning to a link in a graph representing the network that is not in a preferred area of a network a weight that is different than a weight assigned to a link in the graph that is in a preferred area of the network;

adjusting a weight assigned to a link in the graph depending on a proportion of usage of available bandwidth of the link, wherein a link in the graph having heavier usage relative to other links in the graph is adjusted to a weight indicating a lesser preference, and wherein a link in the graph having lighter usage relative to other links in the graph is adjusted to a weight indicating a greater preference; and displaying the graph in a display, wherein vertices represent routers and links represent data links, wherein links in the graph have a directionality indicating a direction in which packets in one embodiment flow on the corresponding data link and wherein two-way data links are represented in the graph by one of a bi-directional link and two back-to-back uni-directional links directed in opposite directions.

17. A provisioning system comprising:

a provisioning engine coupled to a network topology database and a provisioned services database, the provisioning engine to identify candidate paths for newly requested services in a network, each of the newly requested services having a corresponding service description that specifies a corresponding set of requirements, wherein each of the candidate paths are to include a subset of routers of a plurality of routers in the network, wherein the provisioning engine is to determine whether a set of the candidate paths meet the corresponding set of requirements including a minimum bandwidth required by the service being deployed, wherein the minimum bandwidth is determined based on $BW_{min}=\max(BW_{max},(S_{max}/D_{max}))$, wherein $BW_{min}$ represents a minimum bandwidth in bits per second, wherein $BW_{max}$ represents a required maximum bandwidth from the data connection description in bits per second, wherein $S_{max}$ represents a maximum size of a packet in bits, and wherein $D_{max}$ represents a maximum cross router queuing delay in seconds; and a translation modulate coupled to the provisioning engine, the translation module to translate the set of requirements for a set of candidate paths that meet the corresponding set of requirements, the translation to generate corresponding router management commands to configure routers in the plurality of routers.

18. The provisioning system of claim 17, wherein the provisioning engine is further to:

receive a predetermined percentage of bandwidth for each direction of a data link to
provide room for manually deployed services,
provide a buffer to accommodate unanticipated network traffic, and
provide a buffer to accommodate one of an imprecisely understood behaviour and an imprecise bandwidth control in a router feeding of a data link; and determine an effective bandwidth capacity of the data link by subtracting the reserved bandwidth from an available bandwidth associated with the data link.

19. The provisioning system of claim 17, wherein the provisioning engine is further to:

assigning to a link in a graph representing the network that is not in a preferred area of a network a weight that is different than a weight assigned to a link in the graph that is in a preferred area of the network;

adjusting a weight assigned to a link in the graph depending on a proportion of usage of available bandwidth of the link, wherein a link in the graph having heavier usage relative to other links in the graph is adjusted to a weight indicating a lesser preference, and wherein a link in the graph having lighter usage relative to other links in the graph is adjusted to a weight indicating a greater preference; and displaying the graph in a display, wherein vertices represent routers and links represent data links, wherein links in the graph have a directionality indicating a direction in which packets in one embodiment flow on the corresponding data link and wherein two-way data links are represented in the graph by one of a bi-directional link and two back-to-back uni-directional links directed in opposite directions.

20. A machine-readable recording medium storing the instructions that, when executed by a machine, cause the machine to perform operations comprising:

identifying network elements at endpoints of a data connection channel;

generating a candidate path between the network elements at the endpoints;

validating the candidate path by determining whether the candidate path provides at least a service requirement based on a service description describing at least one of:
minimum bandwidth that is to be guaranteed for each data connection,
maximum bandwidth to which each data connection is constrained,
maximum delay that packets in a data connect are allowed to tolerate,
maximum jitter that a data connection is allowed to tolerate,
minimum reliability that each data connection is to be provided,
inclusion of network elements capable of acting as security gateways that bracket untrusted sections of the candidate path,
reachability, and
data collection capability to be instantiated between network locations when the service is in use, configuring network elements along a validated candidate path to implement the service requirement; and identifying a change in a routing table entry;

identifying data connection channels provisioned on a data link connected to an interface referenced by the routing table entry prior to the change;

for each data connection channel provisioned on the data link, identifying whether the data connection channel is affected by the change;

for each data connection affected by the change, de-provisioning the data connection channel affected by the change;

for each data connection channel affected by the change, re-provisioning the data connection channel affected by the change;

reserving a predetermined percentage of bandwidth for each direction of a data link, wherein reserving the predetermined percentage of bandwidth is to
provide room for manually deployed services,
provide a buffer to accommodate unanticipated network traffic, and
provide a buffer to accommodate one of an imprecisely understood behavior and an imprecise bandwidth control in a router feeding of a data link; and determining an effective bandwidth capacity of the data link by subtracting the reserve bandwidth from an available bandwidth associated with the data link.

21. The machine-readable recording medium storing the instructions of claim 20, wherein the service description further describes at least one of:
   subscribers who subscribe the service;
   parties involved in providing or using the service;
   network locations of each party;
   a maximum amount of concurrent usage of the service between the network locations;
   each data connection to be instantiated between the network locations when the service is in use;
   whether data transfer over a data connection is one-way or two-way;
   whether security is to be provided and a security profile which determines nature of the security to be provided; and
   types of data to be collected regarding packets flowing through the data connection and granularity at which the data is to be collected.

22. The machine-readable recording medium storing the instructions of claim 20, wherein operations further comprise recording a configuration performed on the network elements in a provisioning database, wherein the provisioning database stores information selected from a group consisting of:
   a service description;
   a data connection description for describing one of one-way and two-way data connection channels being provisioned;
   security profiles of all services previously provisioned;
   a path taken through a network by each data connection channel; and
   a configuration that has been performed at each router along the path taken by each data connection channel.

23. The machine-readable recording medium storing the instructions of claim 22, wherein the configuration of the network elements are performed further based on network topologies of the network provided via a network topology database, wherein the network topology database stores information selected from a group consisting of:
   a vendor and model of each router that determines what protocols to use to communicate with the router;
   an IP subnet to which each router interface belongs;
   an available bandwidth in each direction of each data link;
   a status of each data link and the interfaces connected;
   a type of packet forwarding mechanism used on each interface;
   a copy of the routing table from each router;
   a copy of any information from each router that indicates which QoS-enhanced forwarding mechanisms are directing packets;
   to whom each IP subnet, and hence each router interface, is dedicated to; and
   whether a router can function as a security gateway.

24. The machine-readable recording medium storing the instructions of claim 20, wherein operations further comprise:
   assigning to a link in a graph representing the network that is not in a preferred area of a network a weight that is different than a weight assigned to a link in the graph that is in a preferred area of the network; and
   adjusting a weight assigned to a link in the graph depending on a proportion of usage of available bandwidth of the link, wherein a link in the graph having heavier usage relative to other links in the graph is adjusted to a weight indicating a less preference, and wherein a link in the graph is adjusted to a weight indicating a lesser preference, and wherein a link in the graph having lighter usage relative to other links in the graph is adjusted to a weight indicating a greater preference.

25. The machine-readable recording medium storing the instructions of claim 24, wherein the operations further comprise displaying the graph in a display, wherein vertices represent routers and links represent data links, wherein links in the graph have a directionality indicating a direction in which packets in one embodiment flow on the corresponding data link, and wherein two-way data links are represented in the graph by one of a bi-directional link and two back-to-back uni-directional links directed in opposite directions.

26. The machine-readable recording medium storing the instructions of claim 25, further comprising determining the minimum bandwidth of the candidate path that is required by the service being deployed,
   wherein each data link in the candidate path includes an available bandwidth equal or greater than the minimum bandwidth of the corresponding data connection channel,
   wherein if any data link in the candidate path does not have an available bandwidth equal or greater than the minimum bandwidth of the corresponding data connection channel, the corresponding available bandwidth equal or greater than the minimum bandwidth of the corresponding data connection channel is removed from the graph for further consideration,
   wherein the minimum bandwidth of the data connection channel is determined based on a product of the minimum bandwidth described in a corresponding data connection description and the maximum amount of concurrent service usage from the service description, and
   wherein the maximum bandwidth of the data connection channel is determined based on a product of the maximum bandwidth from the corresponding data connection description and the maximum amount of concurrent service usage from the service description.

27. The machine-readable recording medium storing the instructions of claim 26, wherein if a router is not capable of managing cross-router queuing delay, the minimum bandwidth is determined based on the following:

$$BW_{min} = max(BW_{max}, (S_{max}/D_{max})),$$

wherein $BW_{min}$ represents a minimum bandwidth in bits per second, wherein $BW_{max}$ represents a required maximum bandwidth from the data connection description in bits per second, wherein $S_{max}$ represents a maximum size of a packet in bits, and wherein $D_{max}$ represents a maximum cross router queuing delay in seconds.

28. A machine-readable recording medium storing the instructions that when executed by a machine, cause the machine to perform operations comprising:
   identifying a candidate path for a newly requested service, the newly requested service having a service description, wherein the newly requested service is in an Internet Protocol (IP) network, the IP network having a plurality of routers, wherein the identified candidate path travels through a set of the plurality of routers;
   determining whether the set of the plurality of routers can be configured to meet a set of requirements specified by the service description,
   generating a graph representing the network, wherein vertices represent routers and links represent data links, wherein each data link in the candidate path includes an available bandwidth equal or greater than the minimum bandwidth of a corresponding data connection channel, wherein if any data link in the candidate path does not have an available bandwidth equal or greater than the minimum bandwidth of the corresponding data connection channel, the corresponding available bandwidth equal or greater than the minimum bandwidth of the corresponding data connection channel is removed from the graph representing the network for further consideration, wherein the minimum bandwidth of the corresponding data connection channel is determined based on a product of the minimum bandwidth described in a corresponding data connection description and the maximum amount of concurrent service usage from the service description, and wherein the maximum bandwidth of the corresponding data communication channel is determined based on a product of the maximum bandwidth from the corresponding data connection description and the maximum amount of concurrent service usage from the service description; and if the set of plurality of routers are determined to meet the set of requirements, then translating the set of requirements into a corresponding set of router management commands to configure each router in the set of the plurality of routers.

29. The machine-readable recording medium storing the instructions of claim 28, wherein the service description comprises:

a minimum bandwidth that is to be guaranteed for each data connection, a maximum bandwidth to which each data connection is constrained, a maximum delay that packets in a data connection are allowed to tolerate, a maximum jitter that a data connection is allowed to tolerate, minimum reliability that each data connection is to be provided, an inclusion of network elements capable of acting as security gateways that bracket untrusted sections of the candidate path, reachability, a data collection capability to be instantiated between network locations when the service is in use, subscribers who subscribe the service, parties involved in providing or using the service, network locations of each party, a maximum amount of concurrent usage of the service between the network locations, each data connection to be instantiated between the network locations when the service is in use, whether data transfer over a data connection is one-way or two-way, whether security is to be provided and a security profile which determines nature of the security to be provided, and types of data to be collected regarding packets flowing through the data connection and granularity at which the data is to be collected.

30. The machine-readable recording medium storing the instructions of claim 28, further comprising:

reserving a predetermined percentage of bandwidth for each direction of a data link, wherein reserving the predetermined percentage of bandwidth is to provide room for manually deployed services, provide a buffer to accommodate unanticipated network traffic, and provide a buffer to accommodate one of an imprecisely understood behaviour and an imprecise bandwidth control in a router feeding of a data link; and determining an effective bandwidth capacity of the data link by subtracting the reserved bandwidth from an available bandwidth associated with the data link.

31. The machine-readable recording medium storing the instructions of claim 28, wherein operations further comprise:

assigning to a link in a graph that is not in a preferred area of a network a weight that is different than a weight assigned to a link in the graph that is in a preferred area of the network;

adjusting a weight assigned to a link in the graph depending on a proportion of usage of available bandwidth of the link, wherein a link in the graph having heavier usage relative to other links in the graph is adjusted to a weight indicating a lesser preference, and wherein a link in the graph having lighter usage relative to other links in the graph is adjusted to a weight indicating a greater preference; and displaying the graph in a display, wherein vertices represent routers and links represent data links, wherein links in the graph have a directionality indicating a direction in which packets in one embodiment flow on the corresponding data link, and wherein two-way data links are represented in the graph by one of a bi-directional link and two back-to-back uni-directional links directed in opposite directions.

32. The machine-readable recording medium storing the instructions of claim 28, wherein if a router is not capable of managing cross-router queuing delay, the minimum bandwidth is determined based on the following:

$$BW_{min} = max(BW_{max}, (S_{max}/D_{max})),$$

wherein $BW_{min}$ represents a minimum bandwidth in bits per second, wherein $BW_{max}$ represents a required maximum bandwidth from the data connection description in bits per second, wherein $S_{max}$ represents a maximum size of a packet in bits, and wherein $D_{max}$ represents a maximum cross router queuing delay in seconds.

33. A machine-readable recording medium storing the instructions that, when executed by a machine, cause the machine to perform operations comprising:

identifying a set of one or more candidate paths for a newly requested service in an Internet Protocol (IP) network having a plurality of routers, wherein each of the candidate paths travels through a different subset of the plurality of routers, the newly requested service having a service description;

eliminating a candidate path from the set of candidate paths whose corresponding subset of the plurality of routers cannot be configured to meet the set of requirements specified by the service description including a minimum bandwidth required by the service being deployed, wherein the minimum bandwidth is determined based on $BW_{min} = max(BW_{max}, (S_{max}/D_{max}))$, wherein $BW_{min}$ represents a minimum bandwidth in bits per second, wherein $BW_{max}$ represents a required maximum bandwidth from the data connection description in bits per second, wherein $S_{max}$ represents a maximum size of a packet in bits, and wherein $D_{max}$ represents a maximum cross router queuing delay in seconds; and translating a remaining candidate path into a set of router management commands to configure the subset of the plurality of routers.

34. The machine-readable recording medium storing the instructions of claim 33, wherein the operations further comprise:
reserving a predetermined percentage of bandwidth for each direction of a data link, wherein reserving the predetermined percentage of bandwidth is to
provide room for manually deployed services,
provide a buffer to accommodate unanticipated network traffic, and
provide a buffer to accommodate one of an imprecisely understood behaviour and an imprecise bandwidth control in a router feeding of a data link; and
determining an effective bandwidth capacity of the data link by subtracting the reserved bandwidth from an available bandwidth associated with the data link.

35. The machine-readable recording medium storing the instructions of claim 33, wherein the operations further comprise:
assigning to a link in a graph representing the network that is not in a preferred area of a network a weight that is different than a weight assigned to a link in the graph that is in a preferred area of the network;
adjusting a weight assigned to a link in the graph depending on a proportion of usage of available bandwidth of the link, wherein a link in the graph having heavier usage relative to other links in the graph is adjusted to a weight indicating a lesser preference, and wherein a link in the graph having lighter usage relative to other links in the graph is adjusted to a weight indicating a greater preference; and
displaying the graph in a display, wherein vertices represent routers and links represent data links, wherein links in the graph have a directionality indicating a direction in which packets in one embodiment flow on the corresponding data link and wherein two-way data links are represented in the graph by one of a bi-directional link and two back-to-back uni-directional links directed in opposite directions.

* * * * *